US011778938B2

(12) United States Patent
Liu et al.

(10) Patent No.: US 11,778,938 B2
(45) Date of Patent: Oct. 10, 2023

(54) AGRICULTURAL MACHINE SECTION CONTROL

(71) Applicant: Deere & Company, Moline, IL (US)

(72) Inventors: Qiang R. Liu, Urbandale, IA (US); Patrick C. Dougherty, Clive, IA (US); Michael R. Moody, Johnston, IA (US); Ajit Thankappan Pillai, West Des Moines, IA (US)

(73) Assignee: Deere & Company, Moline, IL (US)

( * ) Notice: Subject to any disclaimer, the term of this patent is extended or adjusted under 35 U.S.C. 154(b) by 272 days.

(21) Appl. No.: 16/852,994

(22) Filed: Apr. 20, 2020

(65) Prior Publication Data

US 2021/0321554 A1  Oct. 21, 2021

(51) Int. Cl.
| A01B 79/00 | (2006.01) |
| G06N 5/04 | (2023.01) |
| G06N 5/02 | (2023.01) |
| G05D 1/00 | (2006.01) |
| G05B 13/02 | (2006.01) |
| A01D 34/00 | (2006.01) |

(52) U.S. Cl.
CPC .................................. *A01B 79/005* (2013.01)

(58) Field of Classification Search
None
See application file for complete search history.

(56) References Cited

U.S. PATENT DOCUMENTS

| 5,712,782 A | 1/1998 | Weigelt et al. |
| 6,070,539 A | 6/2000 | Flamme et al. |
| 8,186,288 B2 | 5/2012 | Chinkiwsky |
| 9,085,303 B2 | 7/2015 | Wolverton et al. |
| 9,213,905 B2 | 12/2015 | Lange et al. |
| 9,536,527 B1 | 1/2017 | Carlson |
| 10,201,121 B1 * | 2/2019 | Wilson ................. A01B 79/005 |
| 10,408,645 B2 | 9/2019 | Blank et al. |

(Continued)

FOREIGN PATENT DOCUMENTS

| DE | 4322293 A1 | 1/1995 |
| DE | 19514223 A1 | 10/1996 |

(Continued)

OTHER PUBLICATIONS

European Search Report issued in European Patent application No. 20196050.7 dated Feb. 1, 2021, 6 pages.

(Continued)

*Primary Examiner* — Adam D Tissot
*Assistant Examiner* — Laura E Linhardt
(74) *Attorney, Agent, or Firm* — Christopher J. Volkmann; Kelly, Holt & Christenson, PLLC

(57) ABSTRACT

A computer-implemented method of controlling a mobile agricultural machine includes receiving field map data representing a first agricultural operation performed on a field, receiving a location sensor signal indicative of a sensed geographic location of the mobile agricultural machine on the field, the mobile agricultural machine having a plurality of sections that are independently controllable to perform a second agricultural operation on the field that is different than the first agricultural operation, and generating a control signal to control the plurality of sections based on the field map data and the location sensor signal.

20 Claims, 17 Drawing Sheets

(56) References Cited

U.S. PATENT DOCUMENTS

| | | |
|---|---|---|
| 11,112,262 B2 | 9/2021 | Anderson |
| 2006/0119488 A1 | 6/2006 | Hoiness |
| 2006/0178823 A1 | 8/2006 | Eglington |
| 2007/0014434 A1 | 1/2007 | Wei et al. |
| 2011/0054743 A1* | 3/2011 | Kocer ............... A01C 7/06 701/50 |
| 2011/0172873 A1 | 7/2011 | Szwabowski et al. |
| 2012/0237083 A1 | 9/2012 | Lange et al. |
| 2016/0095274 A1* | 4/2016 | Wendte ............. A01B 79/005 111/200 |
| 2016/0120097 A1 | 5/2016 | Chahley et al. |
| 2016/0175869 A1 | 6/2016 | Sullivan et al. |
| 2017/0082442 A1 | 3/2017 | Anderson |
| 2017/0090479 A1 | 3/2017 | Wilcox |
| 2017/0122742 A1 | 5/2017 | Schleicher |
| 2017/0192431 A1 | 7/2017 | Foster et al. |
| 2017/0311534 A1* | 11/2017 | Rusciolelli ......... A01B 79/005 |
| 2018/0014452 A1* | 1/2018 | Starr ................. A01M 13/00 |
| 2018/0359904 A1 | 12/2018 | Foster et al. |
| 2019/0343035 A1* | 11/2019 | Smith ............... A01B 79/005 |
| 2020/0257364 A1 | 8/2020 | Strandberg |
| 2020/0281110 A1* | 9/2020 | McNichols ........... G06N 3/006 |
| 2021/0003416 A1 | 1/2021 | Wilson et al. |
| 2021/0088354 A1 | 3/2021 | Anderson |
| 2021/0364314 A1 | 11/2021 | Anderson |

FOREIGN PATENT DOCUMENTS

| | | |
|---|---|---|
| EP | 1183929 A2 | 3/2002 |
| EP | 2957969 A1 | 12/2015 |
| EP | 3176665 A2 | 6/2017 |

OTHER PUBLICATIONS

Non-Final Office Action for U.S. Appl. No. 17/393,921, dated Jun. 10, 2022, 33 pages.

Extended European Search Report and Written Opinion issued in European Patent Application No. 21162352.5, dated Aug. 16, 2021, in 08 pages.

Final Office Action for U.S. Appl. No. 17/393,921, dated Nov. 25, 2022, 49 pages.

* cited by examiner

FIG. 10

AGRICULTURAL MACHINE SECTION CONTROL

FIELD OF THE DESCRIPTION

The present description generally relates to controlling agricultural machines. More specifically, but not by limitation, the present description relates to section control on an agricultural machine using field map data representing prior machine operations on the field.

BACKGROUND

There are a wide variety of different types of agricultural machines. Such agricultural machines can include different kinds of seeders or planters, as well as tillers, sprayers, harvesters, and other equipment.

These types of machines often attempt to perform location-based agricultural operations. For instance, a planting machine (e.g., a planter, air seeder, grain drill, etc.) can attempt to perform section control (where different sections of the machine are enabled or disabled) based on location. The same type of control can be attempted for sprayers, harvesters, field preparation (e.g., tillage) or other types of agricultural machines. In this way, when the planting machine, spraying machine, or harvesting machine approaches an area of the field that has already been treated (planted, sprayed, harvested, etc.), certain actuators can be deactivated in order to avoid treating that same area twice.

The discussion above is merely provided for general background information and is not intended to be used as an aid in determining the scope of the claimed subject matter.

SUMMARY

A computer-implemented method of controlling a mobile agricultural machine includes receiving field map data representing a first agricultural operation performed on a field, receiving a location sensor signal indicative of a sensed geographic location of the mobile agricultural machine on the field, the mobile agricultural machine having a plurality of sections that are independently controllable to perform a second agricultural operation on the field that is different than the first agricultural operation, and generating a control signal to control the plurality of sections based on the field map data and the location sensor signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 10 illustrates an example user interface display.

DETAILED DESCRIPTION

Figure 1:
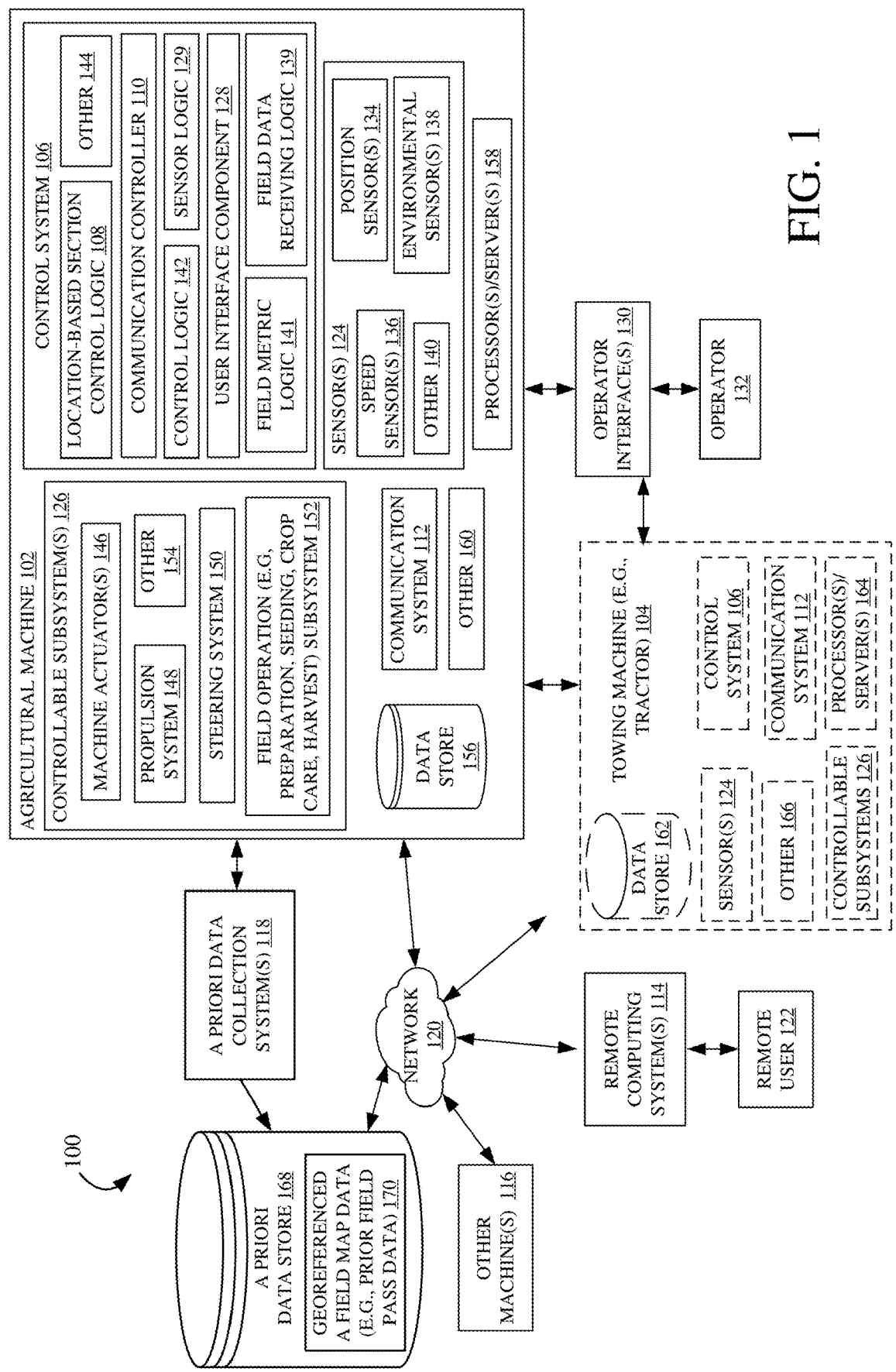
FIG. 1 illustrates one example of an agricultural architecture for location-based section control.

Some agricultural machines attempt to perform location-based operations. For instance, some agricultural machines implement section control features which allow different sections or portions of the machine to be controlled (e.g., turned on or off) independently of other sections on the machine. An independently controllable section of an agricultural machine can include any controllable system, equipment, component, part, etc. of the machine.

For instance, a planting machine can have planting equipment arranged across an implement in independently controllable sections. The term "planting machine" refers to a machine configured to plant or seed a field. For example, a planting machine can include a row crop planter, an air seeder, a grain drill, etc.

On an example row crop planting machine, each section includes one (or more) of the row units and can be turned on or off independently of row unit(s) in other sections. Thus, a section can be one row, or multiple rows. Accordingly, section control includes individual row control. This control can be performed in a of a variety of ways. For instance, seed meter(s) that deliver seed to ground engaging components (e.g., furrow openers, seed boots) can be controlled to selectively plant seed at desired locations. Alternatively, or in addition, the row unit(s) on a section can be raised and lowered into or out of ground engaging position. Therefore, when the planting machine reaches an end row, or is reaching an area of the field that has already been planted, the planting machine may attempt to turn off one or more sections of the planter so that they do not perform an overlapping planting operation in which the seeds are planted over an area that has already been planted or are planted outside the boundary of the field.

Similarly, an agricultural product application machine, such as a spraying machine, can have a section control system that independently controls spray nozzles spaced across the width of the spraying machine. Each section on the spraying machine includes one or more of the spray nozzle(s) and is controllable independent from spray nozzles in other sections, e.g., to prevent overlapping spray areas, spraying outside the boundary of the field, etc. Thus, a section can be one nozzle, or multiple nozzles. Accordingly, section control includes individual nozzle control Section control features can also be implemented on other types of agricultural machines, such as harvesting machines (e.g., controlling header components to selectively harvest areas of a field, generate accurate yield maps, etc.).

An example section control system for such machines requires a pre-defined field boundary that is used with live coverage or pass data (e.g., a current coverage map that identifies areas of the field that have already been operated upon), to determine how to control each section of the machine. However, such field boundaries are often not defined, or are not accurately defined, by the operator. Also, field boundaries may be variable, as the change from year to year. For instance, waterways on or adjacent to a field may expand or recede, thereby changing the actual physical area of the field from one year to the next.

The present description thus proceeds with respect to a control system that utilizes location-based section control based on field map data representing a prior agricultural operation or agricultural machine passes on the field. Using this field map data, the control system is configured to generate control signals to independently control sections of the machine. This can be done without requiring pre-defined or identified field boundaries. This not only removes the requirement of the operator to accurately define, or otherwise identify, field boundaries, it facilitates improved operation and performance of the section control of the agricultural machine.

FIG. 1 illustrates one example of an agricultural architecture 100 for location-based section control of an agricultural machine 102. It is noted that machine 102 can be any of a wide variety of different types of agricultural machines. Examples include, but are not limited to, a tilling machine, a planting machine, a product application (e.g., spraying) machine, a harvesting machine (also referred to as a "harvester" or "combine"), to name a few. Also, while machine 102 is illustrated with a single box in FIG. 1, machine 102 can comprise multiple machines (e.g., a towed implement towed by a towing machine 104). In this example, the elements of machine 102 illustrated in FIG. 1 can be distributed across a number of different machines (represented by the dashed blocks in FIG. 1).

Machine 102 includes a control system 106 configured to control other components and systems of architecture 100. For instance, control system 106 includes location-based section control logic 108 and a communication controller 110 configured to control a communication system 112 to communicate between components of machine 102 and/or with other machines or systems in architecture 100, such as machine 104, remote computing system 114, machine(s) 116, and/or a priori data collection system 118, either directly or over a network 120.

Machine(s) 116 can be a similar type of machine as machine 102, and they can be different types of machines as well. Further, machine(s) 116 can include a machine simultaneously operating in a field (e.g., machines 102 and 116 are in a fleet of machines performing the same or different operations) and/or a machine that operates at a different time (before or after machine 102). For sake of illustration, in an example in which machine 102 is a spraying machine that sprays fertilizer, herbicide, or other agricultural product, machine(s) 116 include a planting machine that planted the field being sprayed by machine 102, another spraying machine working in conjunction with machine 102, and/or a harvesting machine that will subsequently harvest the field.

Network 120 can be any of a wide variety of different types of networks including, but not limited to, a wide area network, such as the Internet, a cellular communication network, a local area network, a near field communication network, or any of a wide variety of other networks or combinations of networks or communication systems.

A remote user 122 is illustrated interacting with remote computing system 114. Remote computing system 114 can be a wide variety of different types of systems. For example, remote system 114 can be a remote server environment, remote computing system that is used by remote user 122. Further, it can be a remote computing system, such as a mobile device, remote network, or a wide variety of other remote systems. Remote system 114 can include one or more processors or servers, a data store, and it can include other items as well.

Communication system 112 can include wired and/or wireless communication logic, which can be substantially any communication system that can be used by the systems and components of machine 102 to communicate information to other items, such as between control system 106, sensor(s) 124, and controllable subsystem(s) 126. In one example, communication system 112 communicates over a controller area network (CAN) bus (or another network, such as an Ethernet network, etc.) to communicate information between those items. This information can include the various sensor signals and output signals generated by the sensor variables and/or sensed variables.

Control system 106 also includes a user interface component 128 configured to control interfaces, such as operator interface(s) 130 that include input mechanisms configured to receive input from an operator 132 and output mechanisms that render outputs to operator 132. The user input mechanisms can include mechanisms such as hardware buttons, switches, joysticks, keyboards, etc., as well as virtual mechanisms or actuators such as a virtual keyboard or actuators displayed on a touch sensitive screen. The output mechanisms can include display screens, speakers, etc.

Control system 106 also includes sensor logic 129 configured to interact with and control sensor(s) 124, which can include any of a wide variety of different types of sensors. In the illustrated example, sensor(s) 124 include position sensor(s) 134, speed sensor(s) 136, environmental sensor(s) 138, and can include other types of sensors 140 as well. Position sensor(s) 134 are configured to determine a geographic position of machine 102 on the field, and can include, but are not limited to, a Global Navigation Satellite System (GNSS) receiver that receives signals from a GNSS satellite transmitter. It can also include a Real-Time Kinematic (RTK) component that is configured to enhance the precision of position data derived from the GNSS signal. Speed sensor(s) 136 are configured to determine a speed at which machine 102 is traveling the field during the spraying operation. This can include sensors that sense the movement of ground-engaging elements (e.g., wheels or tracks) and/or can utilize signals received from other sources, such as position sensor(s) 134.

Control system 106 is also illustrated as including field data receiving logic 139 and field metric logic 141. Field data receiving logic 139 is configured to receive the field data, that is utilized to control machine 102, and field metric logic 141 is configured to generate field metrics represent the operation of machine 102 (such as estimated yield, remaining crop to be processed, remaining operation time, etc.). This is discussed in further detail below.

Control system 106 can includes other control logic 142 and can include other items 144 as well. Control logic 142 is configured to generate control signals to control sensors 124, controllable subsystems 126, communication system 112, or any other items in architecture 100. Controllable subsystems 126 include machine actuators 146, a propulsion subsystem 148, a steering subsystem 150, a field operation subsystem 152 and can include other items 154 as well.

In one example, control of the traversal of machine 102 over the field can be automated or semi-automated, for example using a automated guidance system. An example guidance system is configured to guide machine 102 along a path across the field using the geographic position sensed by sensor(s) 134.

Subsystem 152 is configured to perform field operations (e.g., field preparation, crop care, harvesting, etc.) while machine 102 traverses the field (or other worksite). A field operation refers to any operation performed on a worksite or field. Examples include, but are not limited to, field preparation (e.g., tilling), crop seed placement (e.g., planting), crop care (e.g., fertilizer spraying), harvesting, etc.

For instance, in the case of a planting machine, subsystem 152 includes seed metering and distributions components, such as row units on a row unit planter. In the case of a spraying machine, subsystem 152 includes pumps, valves, lines, spray nozzles, etc. In the case of a harvesting machine, subsystem 152 includes front-end equipment (e.g., a header), thresher, spreader, etc.

Machine 102 includes a data store 156 configured to store data for use by machine 102, such as field data. Examples include, but are not limited to, field location data that identifies a location of the field to be operated upon by a machine 102, field shape and topography data that defines a shape and topography of the field, crop location data that is indicative of a location of crops in the field (e.g., the location of crop rows), or any other data. Machine 102 is also illustrated as including one or more processors or servers 158, and it can include other items 160 as well. Further, where machine 102 is towed by a towing machine 104, machine 104 can include a data store 162, one or more processors or servers 164, and it can include other items 166 as well.

A priori data collection system 182 illustratively collects a priori data corresponding to a target or subject field, that can be used by logic 108 for section control of field operation subsystem 152 while machine 102 operates on the target field. This is discussed in further detail below. Briefly, by a priori, it is meant that the data is formed or obtained beforehand, prior to the operation by machine 102. The data generated by system 118 can be sent to machine 102 directly and/or can be stored in a data store 168 as georeferenced a prior data 170. The data identifies prior machine operations (georeferenced to their corresponding locations) performed in the field, prior to the current operation of machine 102. For instance, data 170 can identify areas of the field that were tilled by a tilling machine, areas planted by a planting machine, areas sprayed by a spraying machine, and/or areas harvested by a harvesting machine. Machine 102 uses this data to determine which areas of the field are to be operated upon by subsystem 152. Logic 108 is configured to generate control signals for subsystems 126 to implement section control, so that machine 102 operates on the desired areas.

For example, in the case of a planting machine, control logic 108 is configured to independently control sections of row units (e.g., a plurality of sections each having one or more row units) to selectively plant the field as machine 102 traverses the field. Each row unit can be controlled by, for example, turning a seed meter on or off, raising and lowering the row unit, etc. In the case of an agricultural spraying machine, sections of the machine include one or more spray nozzles that are independently controllable, independent from the spray nozzles in other sections. Section control includes selectively spraying areas of the field, such as turning spray nozzles on the left-hand side of the machine off, while spray nozzles on the right-hand side of the machine are turned on. In one example of an agricultural harvesting machine, the header can be controlled to selectively harvest only a portion of the width of the machine or identify at the current header location which rows are already harvested or empty, and which rows are unharvested. This information can be utilized, for example, to improve accuracy of a yield map, etc.

Before describing the system and operation in more detail, a number of different examples of agricultural machines will be described.

Figure 2:
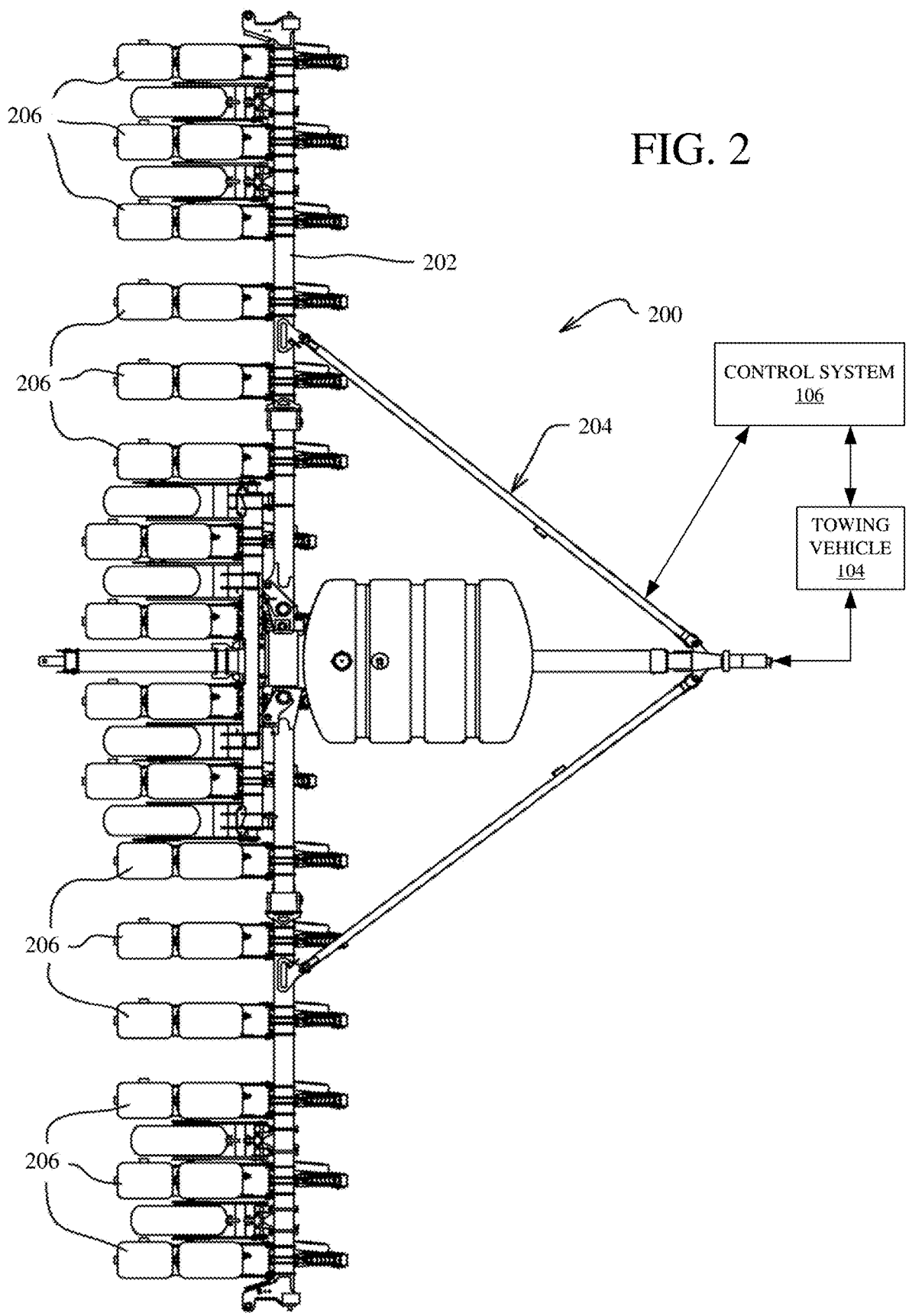
FIG. 2 illustrates one example of an agricultural machine.

FIG. 2 is a top view of one example of an agricultural machine 200, in the form of a row planter or planting machine. Machine 200 illustratively includes a toolbar 202 that is part of a frame 204. FIG. 2 also shows that a plurality of row units 206 are mounted to the toolbar. As noted above, machine 200 can be towed behind towing machine 104. A control system 106 is described in greater detail below, and it can be on one of machines 102 or 104, or elsewhere, and it can be distributed across various locations.

Figure 3:
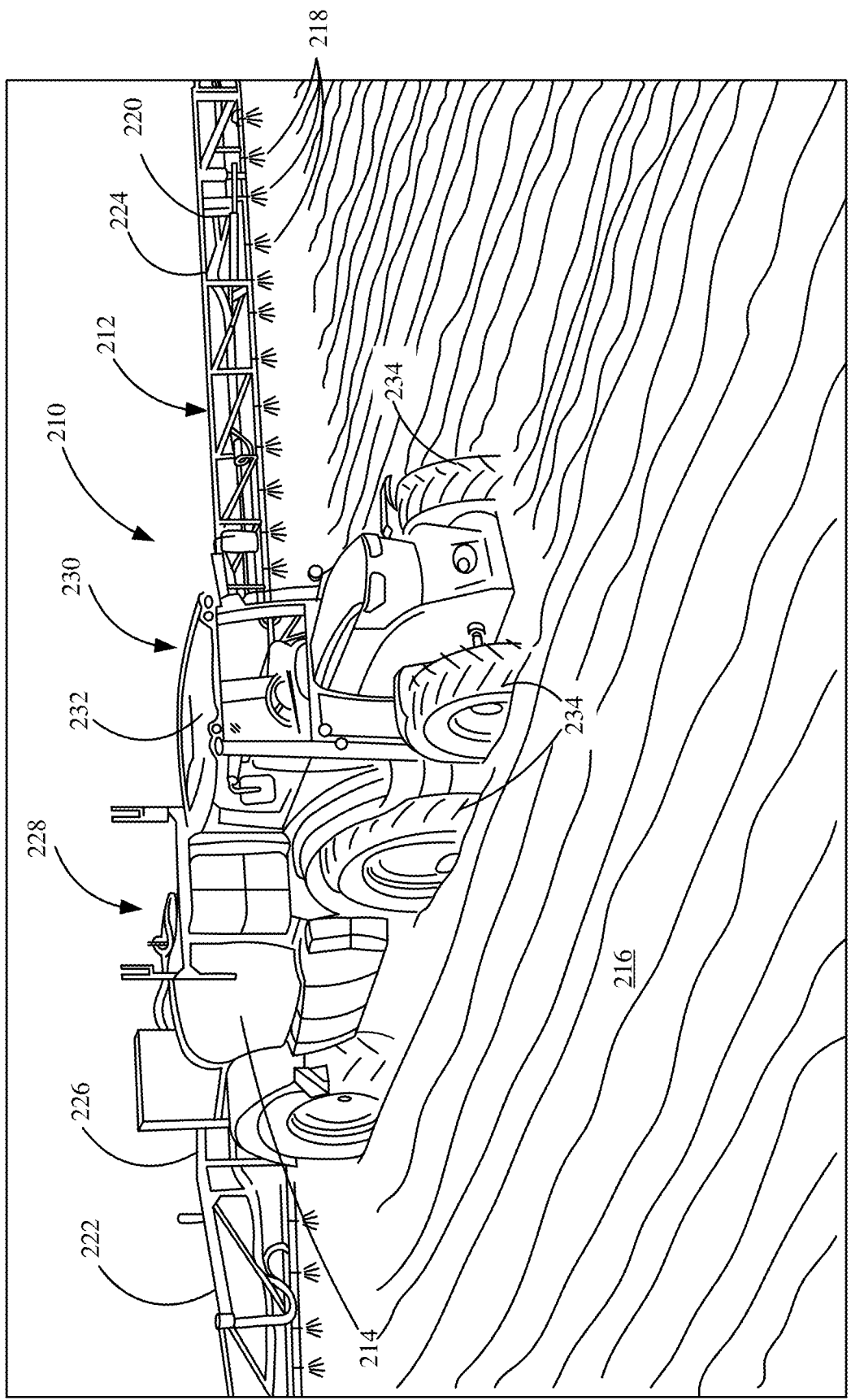
FIG. 3 illustrates one example of an agricultural machine.

FIG. 3 illustrates one example of an agricultural machine 210, in the form of a sprayer or spraying machine. Machine 210 includes a spraying system 212 having a tank 214 containing a liquid that is to be applied to field 216. Tank 214 is fluidically coupled to spray nozzles 218 by a delivery system comprising a set of conduits. A fluid pump is configured to pump the liquid from tank 214 through the conduits through nozzles 218. Spray nozzles 218 are coupled to, and spaced apart along, boom 220. Boom 220 includes arms 222 and 224 which can articulate or pivot relative to a center frame 226. Thus, arms 222 and 224 are movable between a storage or transport position and an extended or deployed position (shown in FIG. 3).

In the example illustrated in FIG. 3, machine 210 comprises a towed implement 228 that carries the spraying system, and is towed by a towing or support machine 230 (e.g., machine 104) having an operator compartment or cab 232. Machine 210 includes a set of traction elements, such as wheels 234. The traction elements can also be tracks, or other traction elements as well. It is noted that in other examples, machine 210 is self-propelled. That is, rather than being towed by a towing machine, the machine that carries the spraying system also includes propulsion and steering systems.

Figure 4:
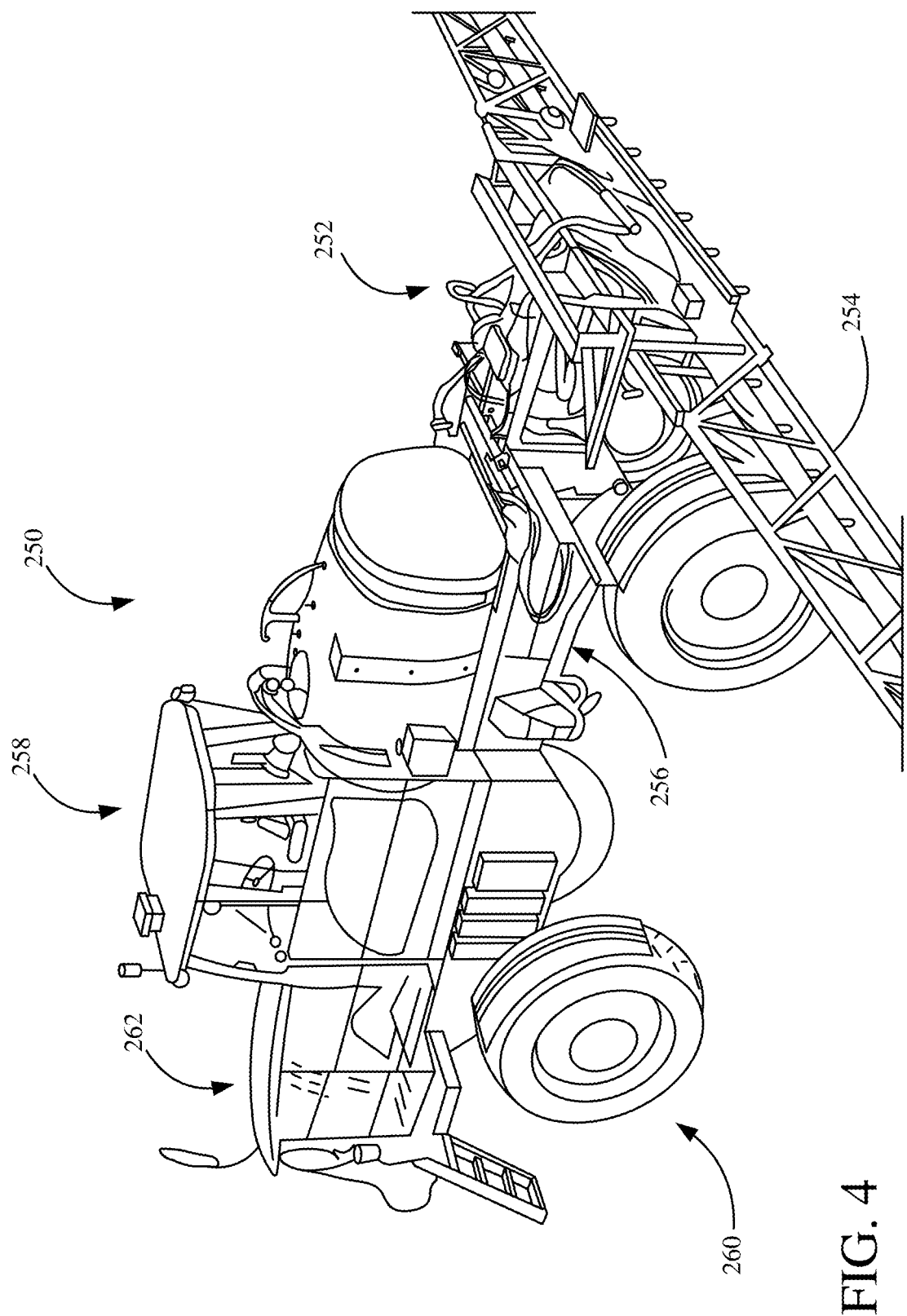
FIG. 4 illustrates one example of an agricultural machine.

FIG. 4 illustrates one example of an agricultural spraying machine 250 that is self-propelled. That is, spraying machine 250 has an on-board spraying system 252, that is carried on a machine frame 256 having an operator compartment 258, a steering system 260 (e.g., wheels or other traction elements), and a propulsion system 262 (e.g., internal combustion engine).

Figure 5:
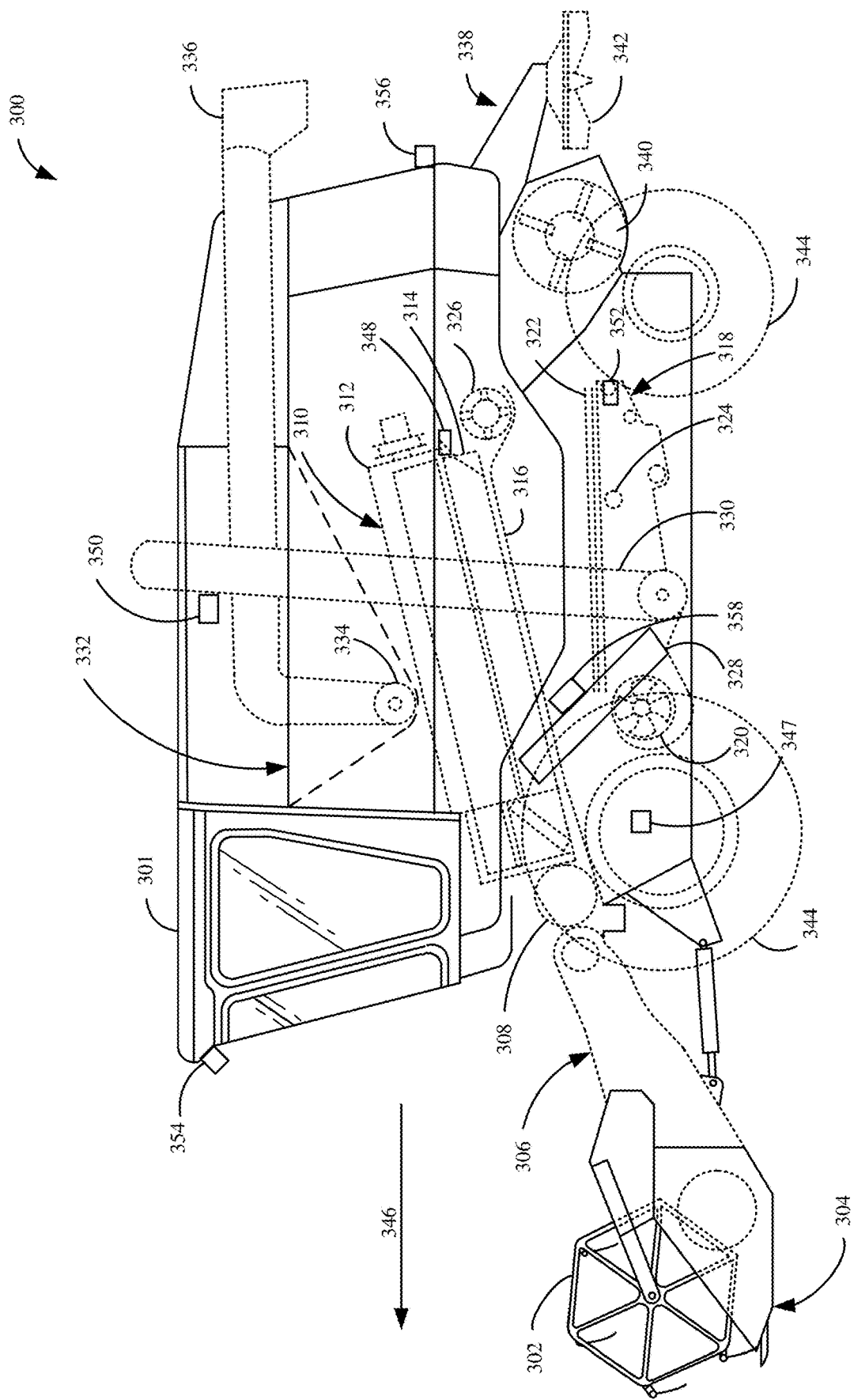
FIG. 5 illustrates one example of an agricultural machine.

Another example agricultural machine is shown in FIG. 5, which is a partial pictorial, partial schematic, illustration of an agricultural harvesting machine 300 (or combine). It can be seen in FIG. 5 that combine 300 illustratively includes an operator compartment 301, which can have a variety of different operator interface mechanisms, for controlling combine 300, as will be discussed in more detail below. Combine 300 can include a set of front-end equipment that can include header 302, and a cutter generally indicated at 304. It can also include a feeder house 306, a feed accelerator 308, and a thresher generally indicated at 310. Thresher 310 illustratively includes a threshing rotor 312 and a set of concaves 314. Further, combine 300 can include a separator 316 that includes a separator rotor. Combine 300 can include a cleaning subsystem (or cleaning shoe) 318 that, itself, can include a cleaning fan 320, chaffer 322 and sieve 324. The material handling subsystem in combine 300 can include (in addition to a feeder house 306 and feed accelerator 308) discharge beater 326, tailings elevator 328, clean grain elevator 330 (that moves clean grain into clean grain tank 332) as well as unloading auger 334 and spout 336. Combine 300 can further include a residue subsystem 338 that can include chopper 340 and spreader 342. Combine 300 can also have a propulsion subsystem that includes an engine that drives ground engaging wheels 344 or tracks, etc. It will be noted that combine 300 may also have more than one of any of the subsystems mentioned above (such as left and right cleaning shoes, separators, etc.).

In operation, and by way of overview, combine 300 illustratively moves through a field in the direction indicated by arrow 346. As it moves, header 302 engages the crop to be harvested and gathers it toward cutter 304. After it is cut, it is moved through a conveyor in feeder house 306 toward feed accelerator 308, which accelerates the crop into thresher 310. The crop is threshed by rotor 312 rotating the crop against concave 314. The threshed crop is moved by a separator rotor in separator 316 where some of the residue is moved by discharge beater 326 toward the residue subsystem 338. It can be chopped by residue chopper 340 and spread on the field by spreader 342. In other implementations, the residue is simply dropped in a windrow, instead of being chopped and spread.

Grain falls to cleaning shoe (or cleaning subsystem) 318. Chaffer 322 separates some of the larger material from the grain, and sieve 324 separates some of the finer material from the clean grain. Clean grain falls to an auger in clean grain elevator 330, which moves the clean grain upward and deposits it in clean grain tank 332. Residue can be removed from the cleaning shoe 318 by airflow generated by cleaning fan 320. That residue can also be moved rearwardly in combine 300 toward the residue handling subsystem 338.

FIG. 5 also shows that, in one example, combine 300 can include ground speed sensor 347, one or more separator loss sensors 348, a clean grain camera 350, one or more cleaning shoe loss sensors 352, forward looking camera 354, rearward looking camera 356, a tailings elevator camera 358, and a wide variety of other cameras or image/video capture devices. Ground speed sensor 347 illustratively senses the travel speed of combine 300 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed. In one example, optical sensor(s) capture images and optical flow is utilized to determine relative movement between two (or more) images taken at a given time spacing.

Figure 6:
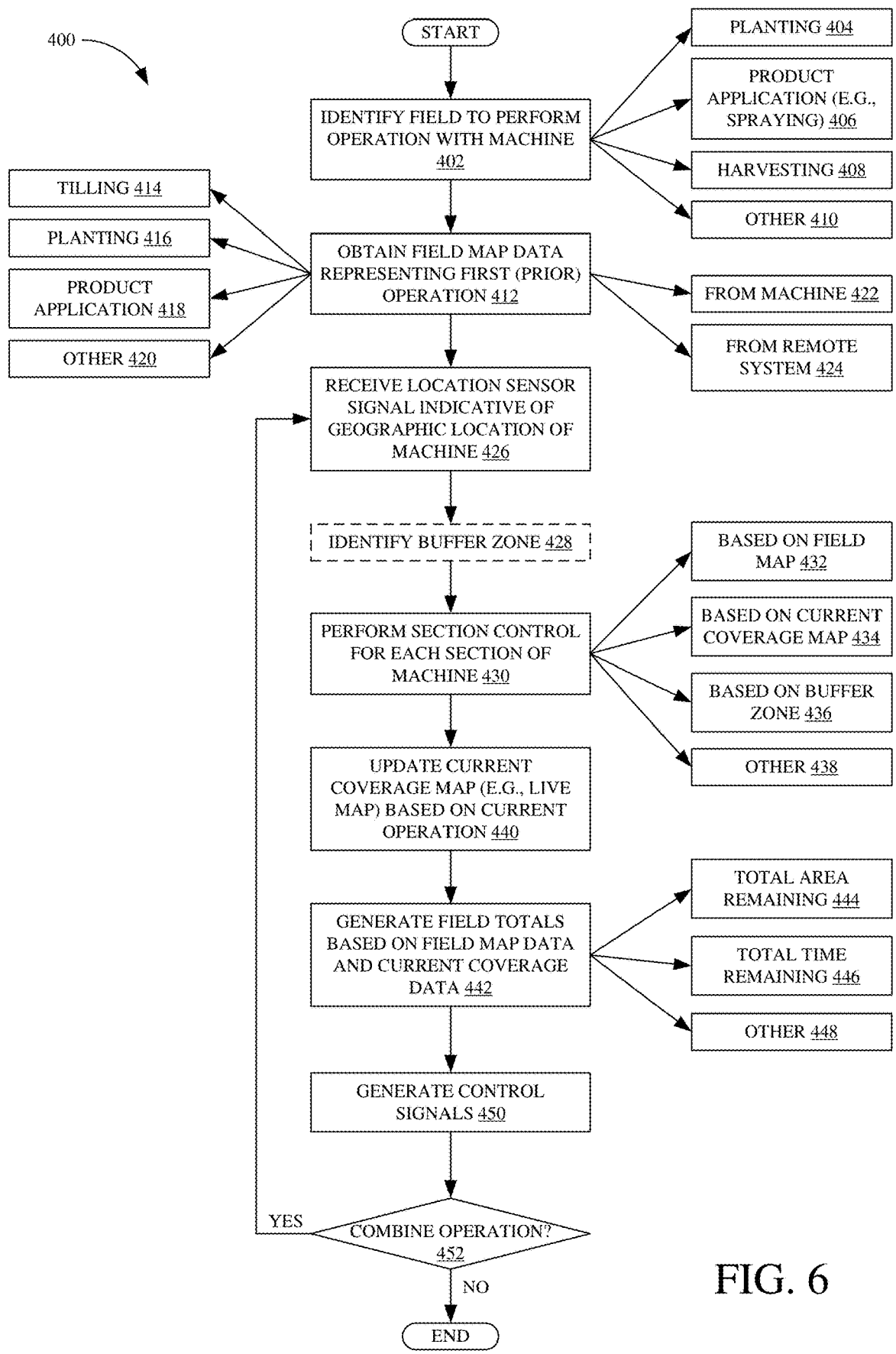
FIG. 6 is a flow diagram illustrating an example operation of section control on an agricultural machine using previous field pass map data.

FIG. 6 is a flow diagram 400 illustrating an example operation of location-based section control on an agricultural machine using previous field pass map data. For sake of illustration, but not by limitation, FIG. 6 will be described in the context of control system 106 controlling agricultural machine 102, shown in FIG. 1.

At block 402, a target field on which to perform an agricultural operation with machine 102 is identified. The target field can be identified in any of a number of ways. For instance, the target field can be automatically identified based on the detected location of machine 102 prior to or during the operation. Alternatively, or in addition, the target field can be identified based on input from operator 132, input from remote system 114, or otherwise.

As noted above, the agricultural operation performed with machine 102 can comprise a wide variety of different types of operations, depending on the type of machine. For instance, the operation performed with machine 102 can be a planting operation. This is represented at block 404. In another example, the operation can be a product application, such as spraying or otherwise applying a fertilizer, herbicide, pesticide, fungicide, or other product. This is represented at block 406. In another example, the operation performed by machine 102 is a harvesting operation. This is represented at block 408. Of course, other types of operations can be performed by machine 102. This is represented at block 410.

At block 412, field map data is obtained that represents a prior agricultural operation performed on the target field. Illustratively, the prior agricultural operation is a different type of agricultural operation than the operation to be performed by machine 102. For instance, the prior agricultural operation can include a tilling operation (block 414), a planting operation (block 416), a product application operation (block 418—such as those described above with respect to block 406), and can include other types of operations as well (block 420). For example, in the case of the planting operation at block 416, the field map data includes a planting map that can be used for follow up operations of crop care and/or harvest.

The field map data can be obtained at block 412 in any of a number of ways. For instance, the data can be obtained directly, or indirectly, from the machine that performed the prior operation (block 422), from a remote system (such as remote system 114) (block 424), or otherwise. In one example, the field map data includes data 170 generated by system 118.

Figure 7:
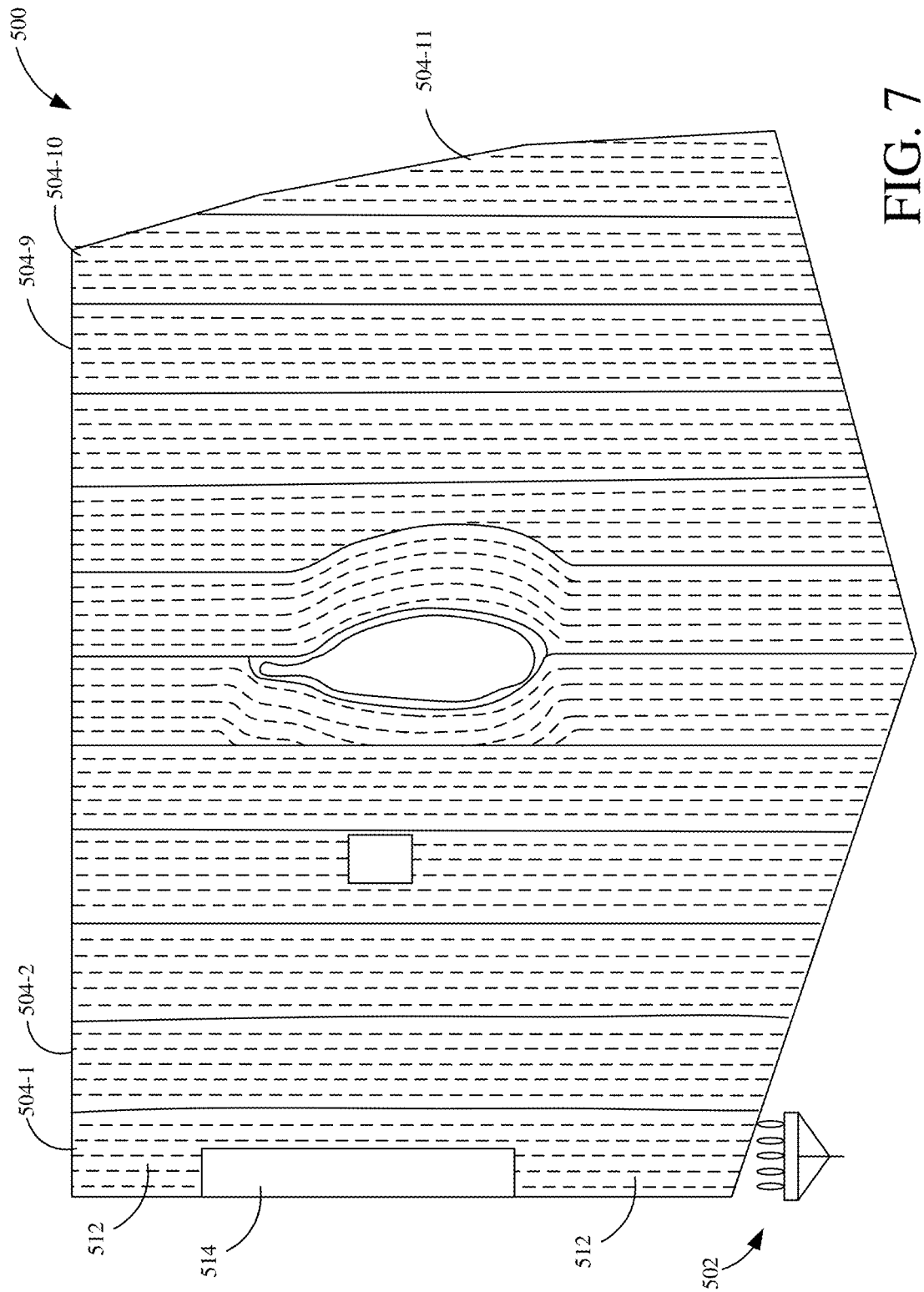
FIG. 7 represents an example operation that generates field map data.

For sake of illustration, FIG. 7 represents an example operation that generates the field map data, obtained at block 412. FIG. 7 illustrates an example field 500 on which an agricultural machine 502, in the form of a row crop planter, performs a planting operation to plant seeds through a plurality of passes over field 500. While the example in FIG. 7 includes a planting operation, in other examples the operation can include tilling, spraying, etc.

The dashed lines in FIG. 7 illustrate the rows corresponding to row units on machine 502 during passes 504-1, 504-2, 504-11, etc. (collectively referred to as passes 504). Machine 502 can be configured to perform location-based section control to selectively turn on and off sections of machine 502. As shown in FIG. 7, as machine 502 reaches the end of pass 504-1, near a boundary of field 500, row units on the machine are selectively turned off to avoid planting in an area outside the boundary of field 500.

It is noted that the field map data can be generated at any of a variety of different levels of detail or granularity. For instance, the field map data can represent the areas of field 500 traversed by machine 502, as well as machine state data indicating whether machine 502 (e.g., the particular row units) was actively planting at those locations. That is, the machine state can be a binary signal indicating whether the row unit(s) were turned on or off at those locations. The machine state data is correlated to the areas of the field to form the field map data. In another example, the field map data can identify the actual planting locations of the seeds, by detecting the operation of the row units during the planting operation. In any case, the field map data identifies areas that were planted during the prior operation.

For sake of illustration, in the example of FIG. 7 the field map data indicates that, for pass 504-1, machine 502 was actively planting in areas 512, but was deactivated (e.g., not actively planting) in area 514 (e.g., because area 514 is wet).

Referring again to FIG. 6, at block 426 a location sensor signal is received that indicates the geographic location of machine 102. For example, a location signal is received from position sensor 134 indicating a current location of machine 102 on the target field.

At block 428, a buffer or offset zone relative of the mapped field area is identified. The buffer zone indicates an area proximate a mapped field area in which to perform the field operation. For instance, in the case of the field map of FIG. 5, the buffer zone can identify an area surrounding the map to sprayed with fertilizer, herbicide, etc. In one example, the buffer zone can be set to a default value of zero (no buffer zone), and adjusted by operator 132 so that machine 102 is controlled to spray within a specified distance (e.g., five feet, ten feet, etc.). This can include positive distances (i.e., outside the field map area) as well as negative distances (i.e., inside the field map area).

At block 430, section control of machine 102 is performed using control logic 108. This is discussed in further detail below with respect to FIG. 8. Briefly, however, section control can be based on the field map data obtained at block 412. This is represented at block 432. Also, the section control can be based on a current coverage map. This is represented at block 434. An example coverage map represents the current operation of machine 102 on the target field. For instance, the current coverage map identifies areas that machine 102 has already planted, sprayed, harvested, etc. Also, the section control can be based on the buffer zone identified at block 428. This is represented at block 436. Of course, the section control can be performed in other ways as well. This is represented at block 438.

At block 440, the current coverage map is updated based on operation of machine 102. At block 442, field totals can be generated based on the field map data and the current coverage map. For example, block 442 can include determining a total area remaining to be operated on by machine 102 (block 444), a total remaining time 446, or other operational metrics (block 448).

At block 450, control signals can be generated to control machine 102, or other machines or systems in architecture 100. For example, this can include automatically controlling controllable subsystem(s) 126, controlling communication system 112 to send operational data, such as the field total generated at block 442, to remote system 114, generating operator interfaces 130, etc. Examples of user interface displays are discussed below. At block 452, if operation of machine 102 is continued, the operation returns to block 426.

Figure 8:
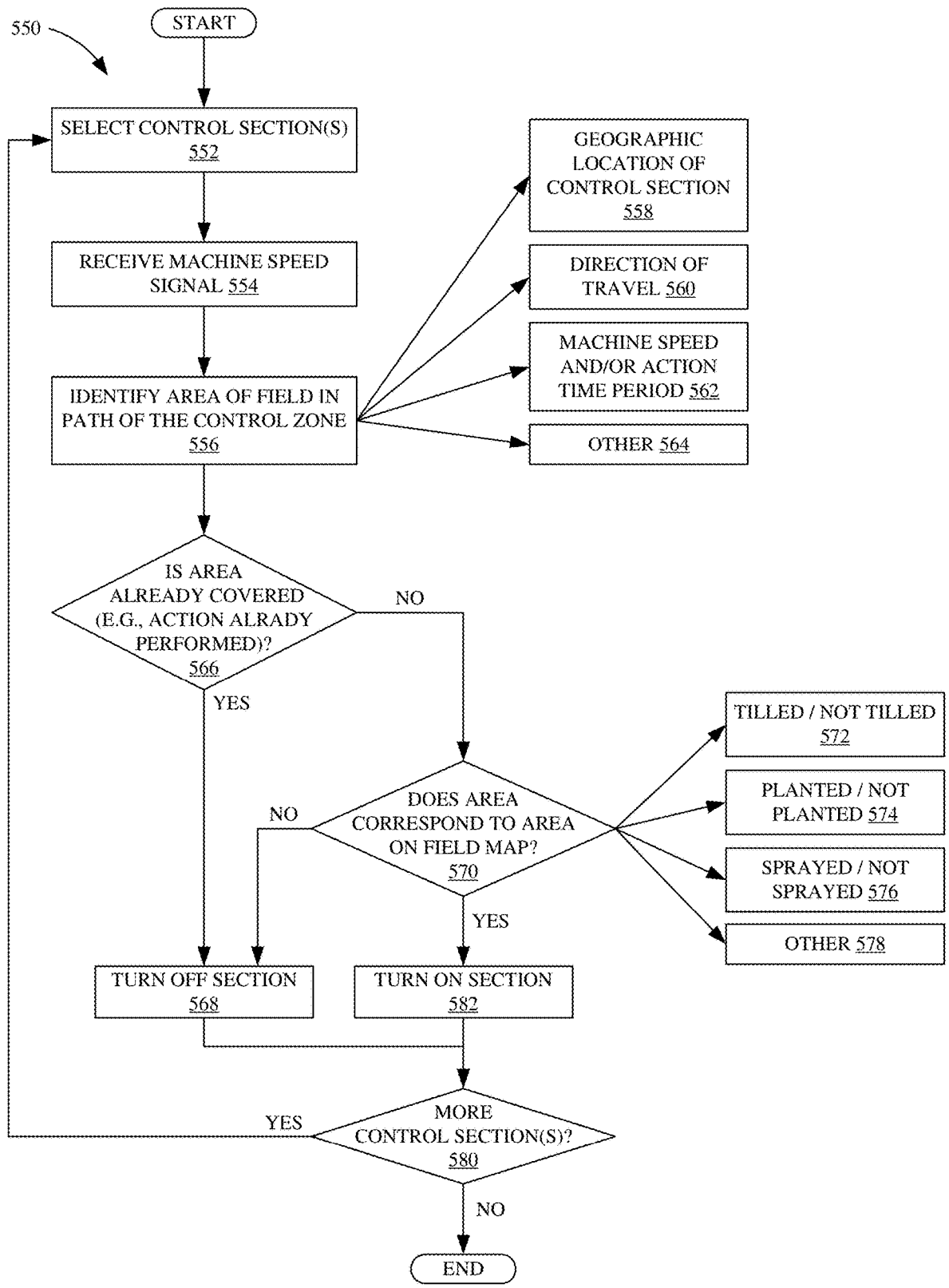
FIG. 8 is a flow diagram illustrating an example section control operation.

FIG. 8 is a flow diagram 550 illustrated in example section control operation. For sake of illustration, but not by limitation, FIG. 8 will be described in the context of control system 106 controlling machine 102 in the form of a spraying machine (e.g., machine 210, 250, etc.). At block 552, one (or more) of the control zones are selected to dynamically determine their on/off state. As noted above, a control zone on a spraying machine can include one or more spray nozzles that independently controllable, independent from the spray nozzle(s) in other sections of the machine.

At block 554, a machine speed signal is received, that indicates the speed of machine 102. At block 556, an area of the field in the path of the selected control zone(s) is identified. This can be based on the geographic location of the control zone (block 558), the direction of travel of machine 102 (block 560), the machine speed and/or action time period for controlling the control zone (block 562), and it can be based on other considerations (block 564) as well.

The geographic location at block 558 can be determined based on a geographic location signal that is specific to the control section. Alternatively, or in addition, the geographic location and be determined based on a geographic location of machine 102 (i.e., the location of a receiver on machine 102), that is correlated to the position of the control section. In other words, for each control section, the location can be determined based on determining the location of the receiver of machine 102 and the positional offset of the control section from that receiver location.

In one example of block 562, the action time period represents a minimum time period between control section switching operations. That is, it can represent a minimum time required between switching the control section from an on state to an off state, and vice versa.

In any case, block 556 identifies an area on the target field in front of the control section, in a direction of travel. Block 566 determines whether the identified area is already covered. That is, block 566 determines whether machine 102 has already operated on that area. In the present example, block 566 determines whether machine 102 has already sprayed the area. If so, operation proceeds to block 568 in which control logic 108 generates a control signal to turn off or deactivate the control section(s).

If the area has not already been covered, operation proceeds to block 570 in which control system 106 determines whether the area corresponds to an area on the field map, representing the prior operation on the field (e.g., the field map data obtained at block 412). For example, this can include determining whether the area has been tilled or is untilled (block 572), has been planted or is unplanted (block 574), and/or whether the area has been sprayed or has not been sprayed (block 576). Of course, the field map data can identify other types of prior operations as well. This is represented by block 578.

In the present example of a spraying machine, block 570 determines whether the area in the path of the selected control section was planted during the prior planting operation. If not, operation proceeds to block 568, in which the selected control section(s) are turned off or deactivated and the operation proceeds to block 580, in which operation returns to block 552 for any additional control sections on machine 102.

If the identified area does correspond to the field map (e.g., it was planted during the prior planting operation), operation proceeds to block 582 in which the control section is turned on or activated.

Figure 9:
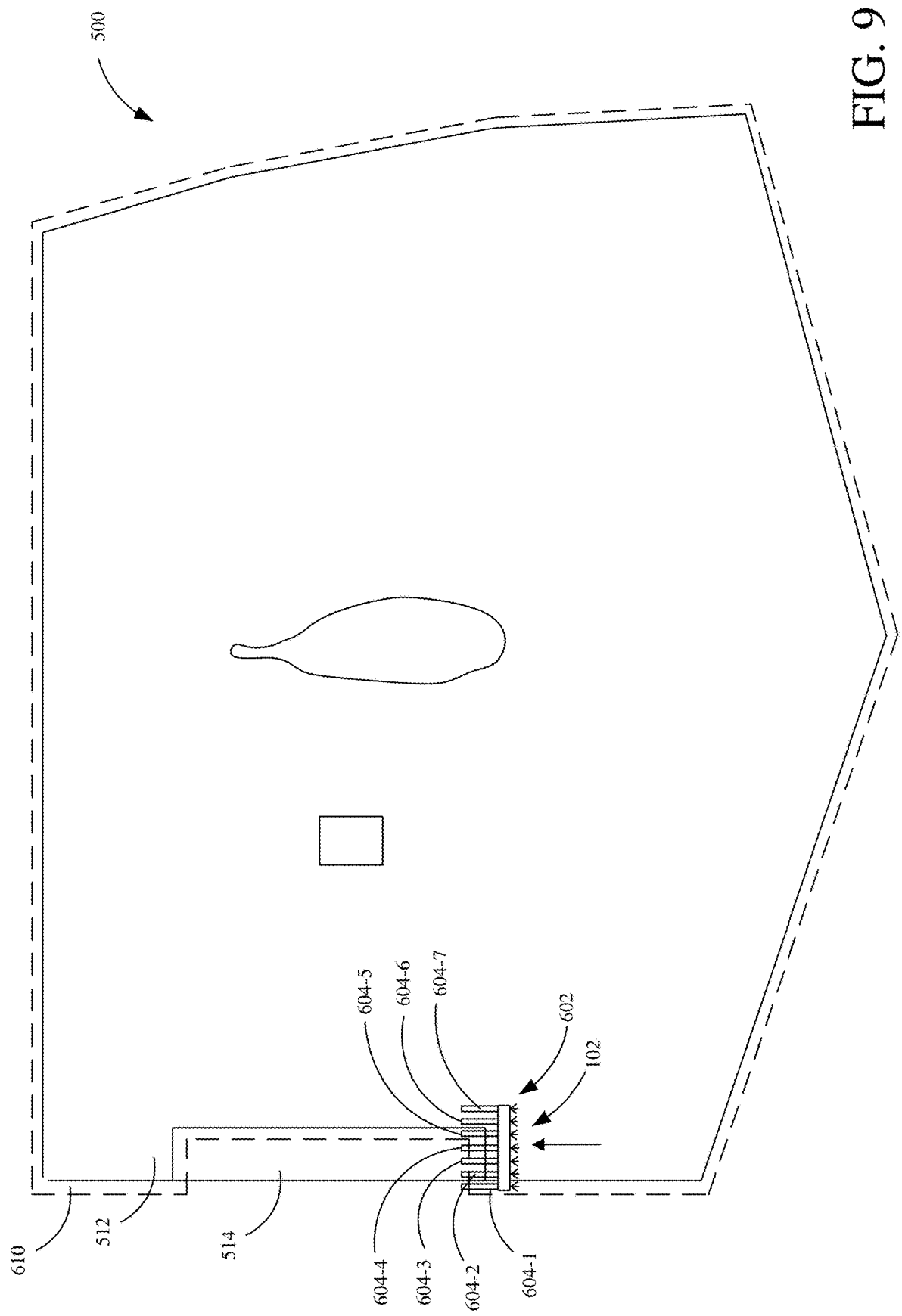
FIG. 9 illustrates an example agricultural machine operating on a field.

For sake of illustration, FIG. 9 illustrates machine 102, in the form of a sprayer operating on the field 500 illustrated in FIG. 7 to spray fertilizer to the crop plants. In the example of FIG. 9, machine 102 has a plurality of sections 602, each having one or more spray nozzles. While seven sections are illustrated, it is noted that machine 102 can have more, or less, control sections. For each section, an area in the path of the control section is identified. For instance, for a first control section, an area 604-1 is identified. Similarly, areas 604-2, 604-3, 604-4, 604-5, 604-6, and 604-7 are identified, respectively, as corresponding to the other control sections of machine 102.

In the present example, control logic 108 determines that the control sections corresponding to areas 604-6 through 604-7 are all in areas that have not already been covered by machine 102 and are within the previously planted area 512 of field 500. Accordingly, control logic 108 turns on or activates those sections to spray field 500. Control logic 108 also determines that the control section corresponding to area 604-5 is within the buffer or offset zone 610 (represented by the dashed line in FIG. 9), and also turns on or activates that control section as well. However, control logic 108 determines that the sections corresponding to areas 604-1, 604-2, 604-3, and 604-4 are will pass over area 514

(which was not planted by the operation in FIG. 7) and is outside the buffer area of the planting map (i.e., those sections will be operating on unplanted areas). Control logic 108 deactivates or turns off those sections.

Figure 10:
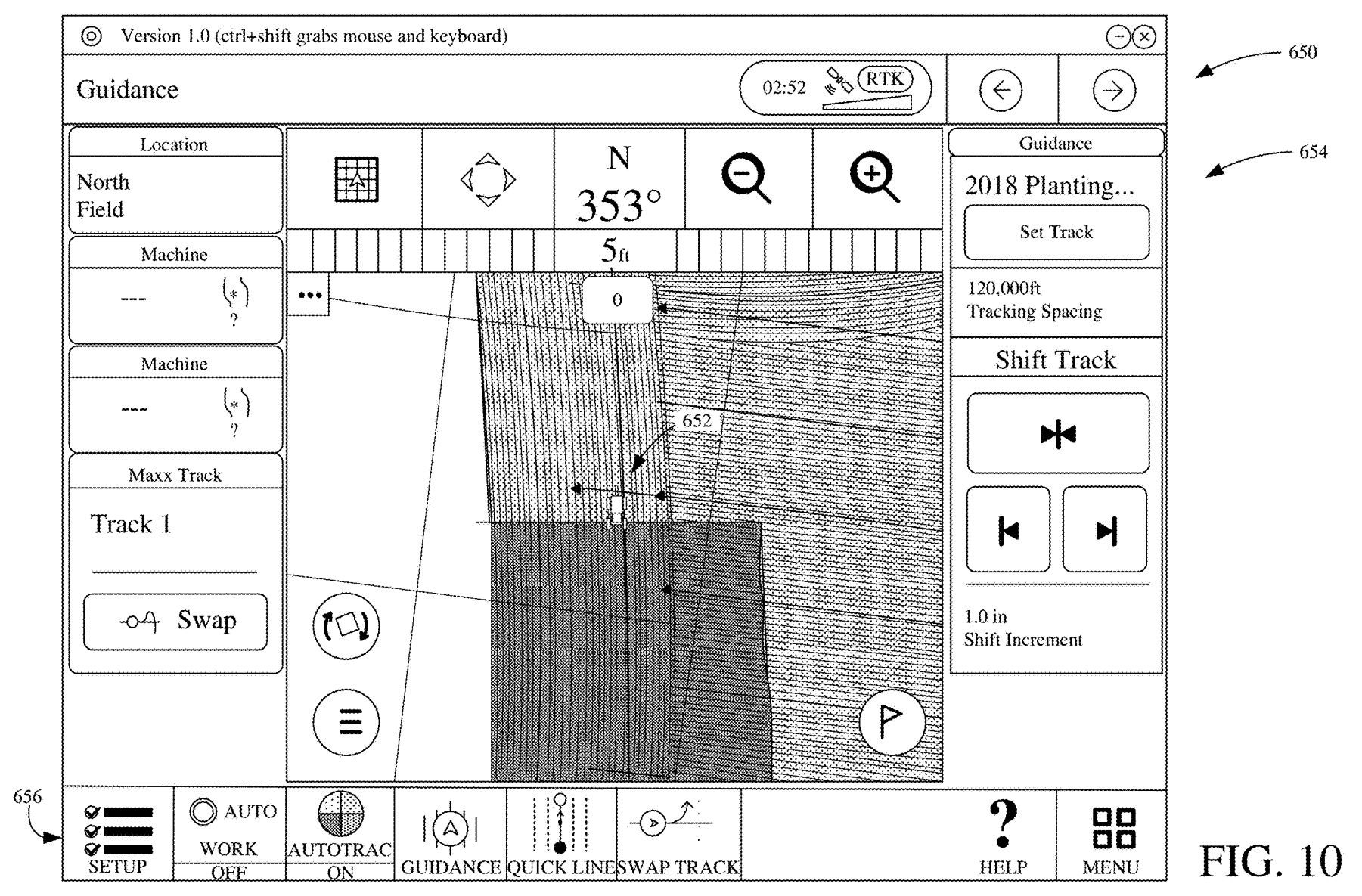
Figure 11:
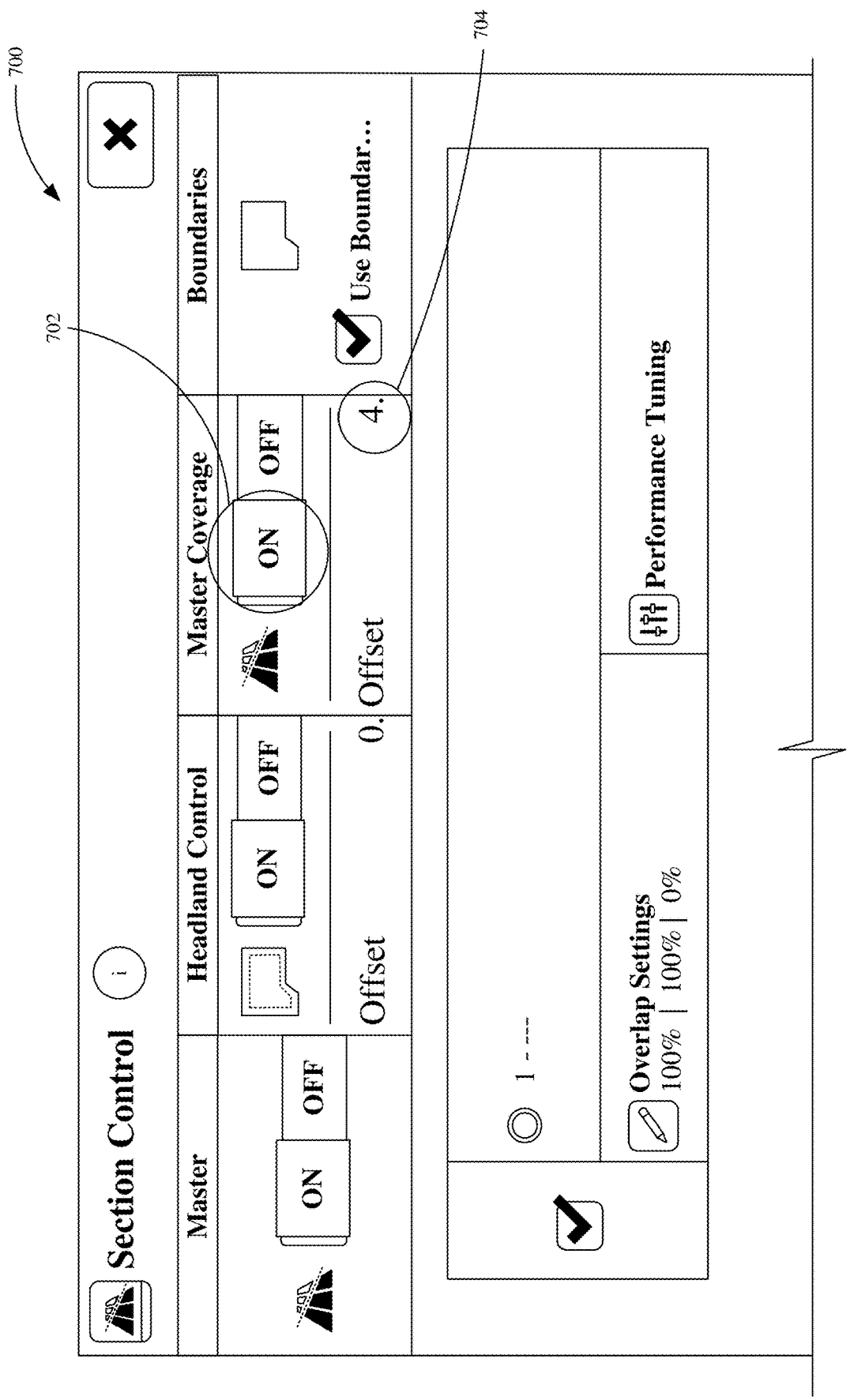
FIG. 11 illustrates an example user interface display.
Figure 12:
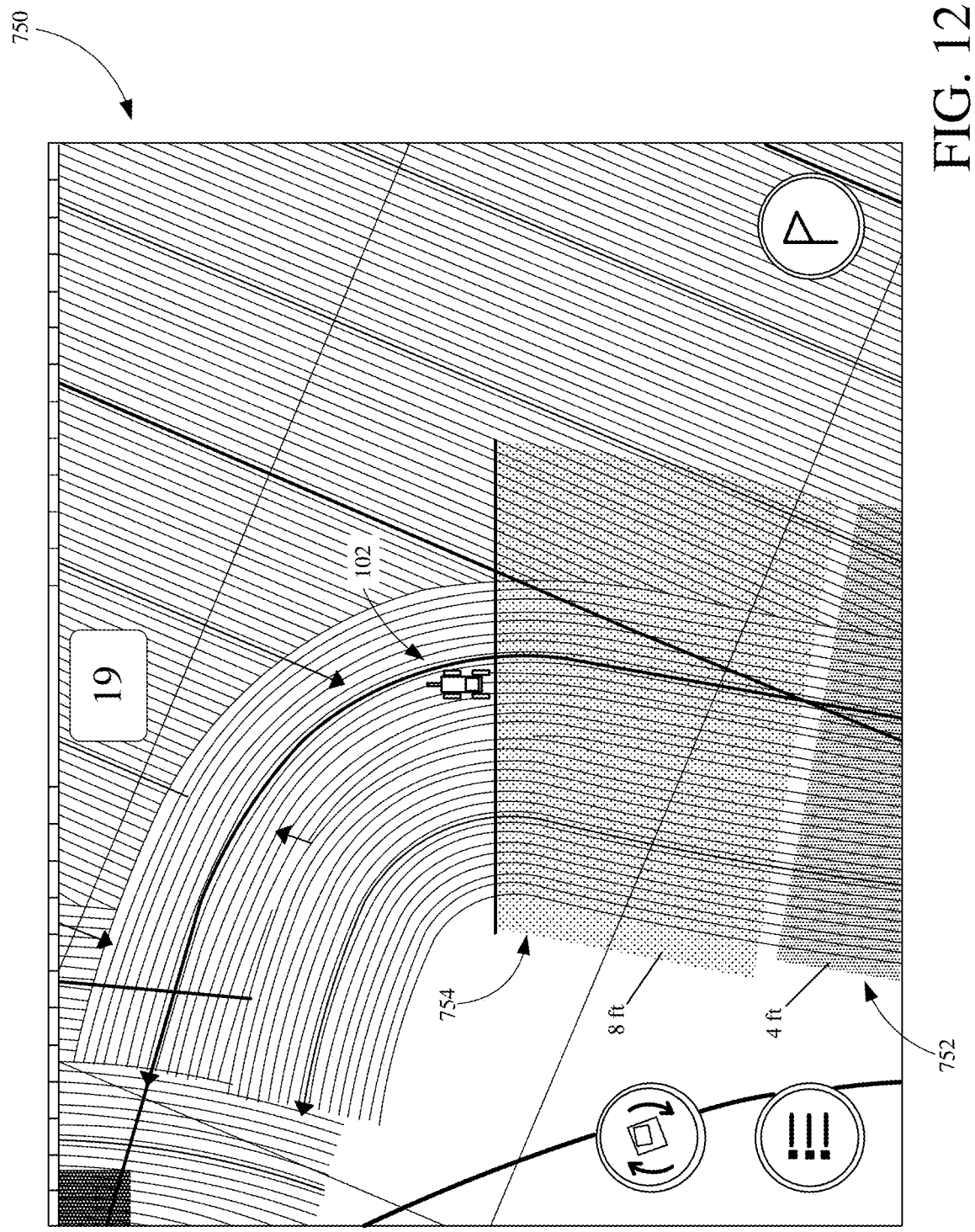
FIG. 12 illustrates an example user interface display.

FIGS. 10-12 illustrate example user interface displays that can be displayed to operation 132, or another user such as remote user 122.

User interface display 650 illustrated in FIG. 10 displays a representation of the field along with the position and heading of the machine. The position of the machine is represented by display element 652. Display 650 includes user input mechanisms 654 for setting guidance controls and user input mechanism 656 to configure section control. Actuation of mechanism 656 displays a user interface display 700 illustrated in FIG. 11. As shown in FIG. 11, display 700 includes a user input mechanism 702 for enabling or disabling field map-based section control. Display 700 also includes an offset user input mechanism 704 for defining the offset or buffer zone, as discussed above. In the present example, operator 132 has set the buffer zone to four feet, so that machine 102 is configured to spray a four foot buffer zone around the area of the field that has been planted, as determined by the field map data. FIG. 12 illustrates a display 750 showing the coverage of machine 102 as it performs the example spraying operation on the field. In the present example, the buffer zone was changed from four feet at area 752 to eight feet at area 754.

It can thus be seen that the present features provide a control system with section control that does not require pre-defined field boundaries. The control system uses field map data representing a prior agricultural operation to control the operation of the agricultural machine. This improves operation of the machine, such as by preventing or limiting overspray, while accommodating changing field conditions and/or agricultural operations from year to year.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 13:
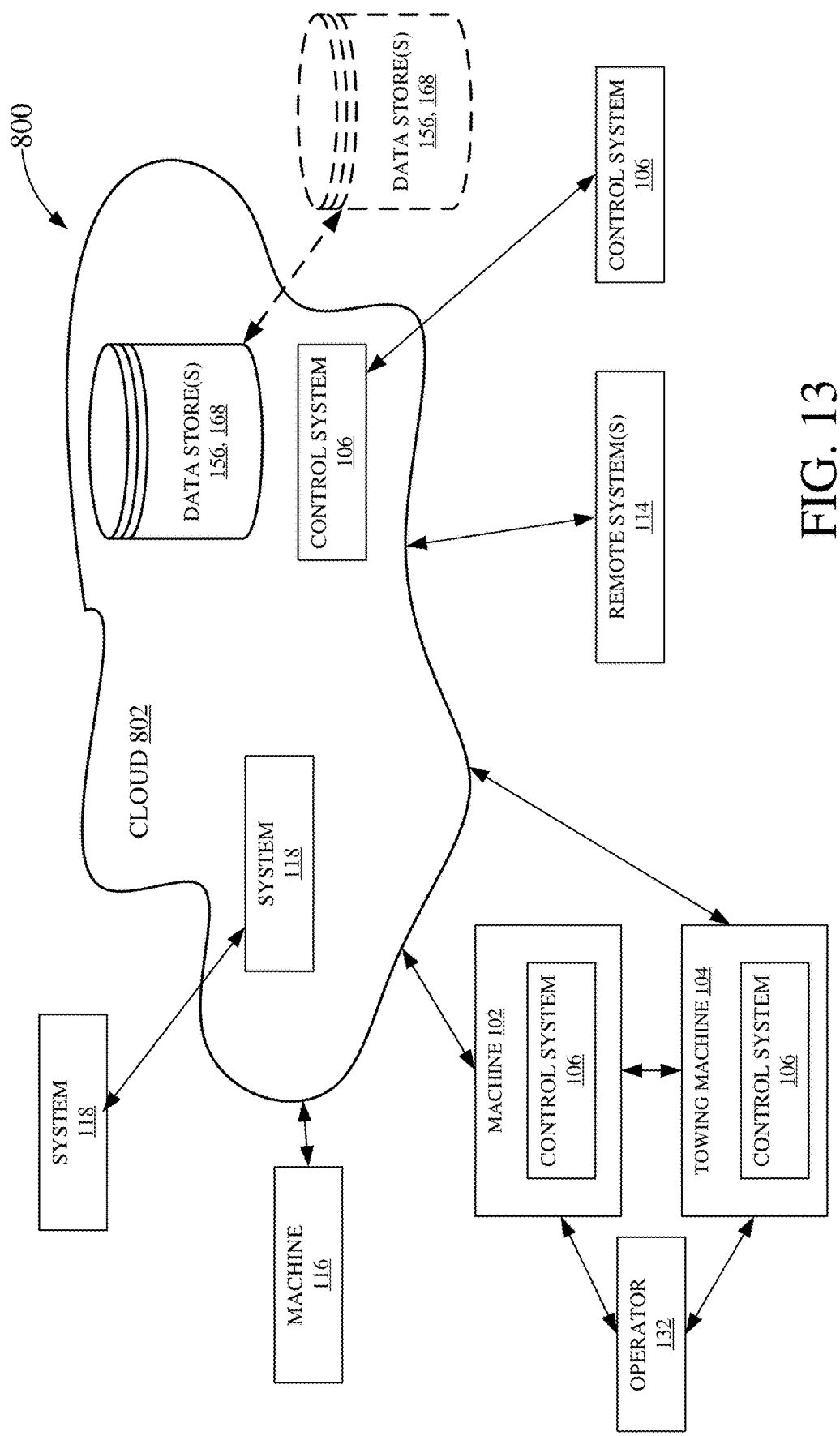
FIG. 13 is a block diagram showing one example of the control system illustrated in FIG. 1, deployed in a remote server architecture.

FIG. 13 is a block diagram of one example of agricultural architecture 100, shown in FIG. 1, where machine 102 communicates with elements in a remote server architecture 800. In an example, remote server architecture 800 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 13, some items are similar to those shown in previous FIGS. and they are similarly numbered. FIG. 13 specifically shows system 106 and/or system 118 from previous FIGS. can be located at a remote server location 802. Therefore, machine 102, machine 104, machine 116, and/or system 114 can access those systems through remote server location 802.

FIG. 13 also depicts another example of a remote server architecture. FIG. 13 shows that it is also contemplated that some elements of previous FIGS. are disposed at remote server location 802 while others are not. By way of example, one or more of data store 156, data store 168, system 106, and system 118 can be disposed at a location separate from location 802, and accessed through the remote server at location 802. Regardless of where they are located, they can be accessed directly by machines 102, 104, and/or 116 through a network (either a wide area network or a local area network), they can be hosted at a remote site by a service, or they can be provided as a service, or accessed by a connection service that resides in a remote location. All of these architectures are contemplated herein.

It will also be noted that the elements of the FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 14:
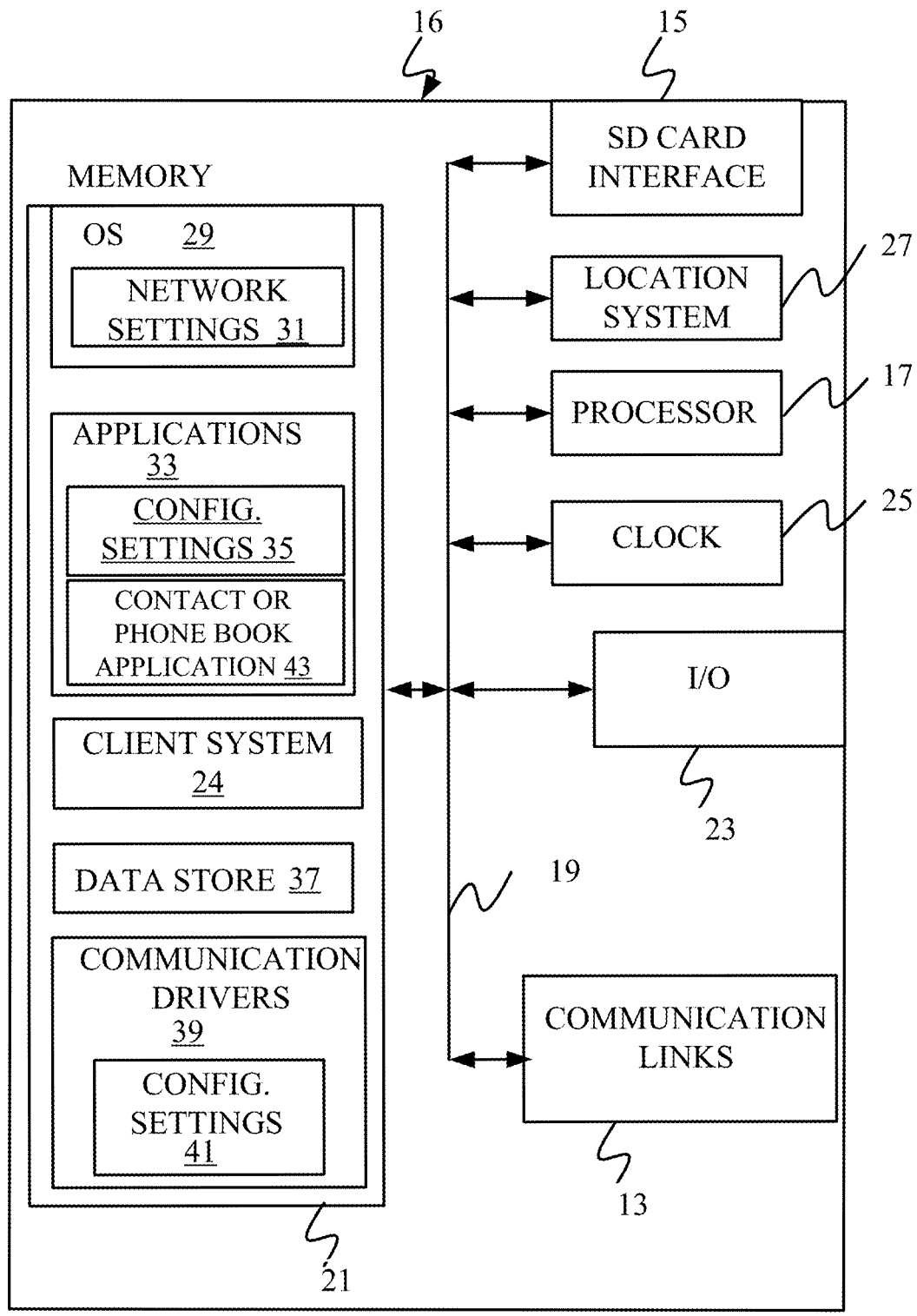
FIGS. 14-16 show examples of mobile devices.
Figure 15:
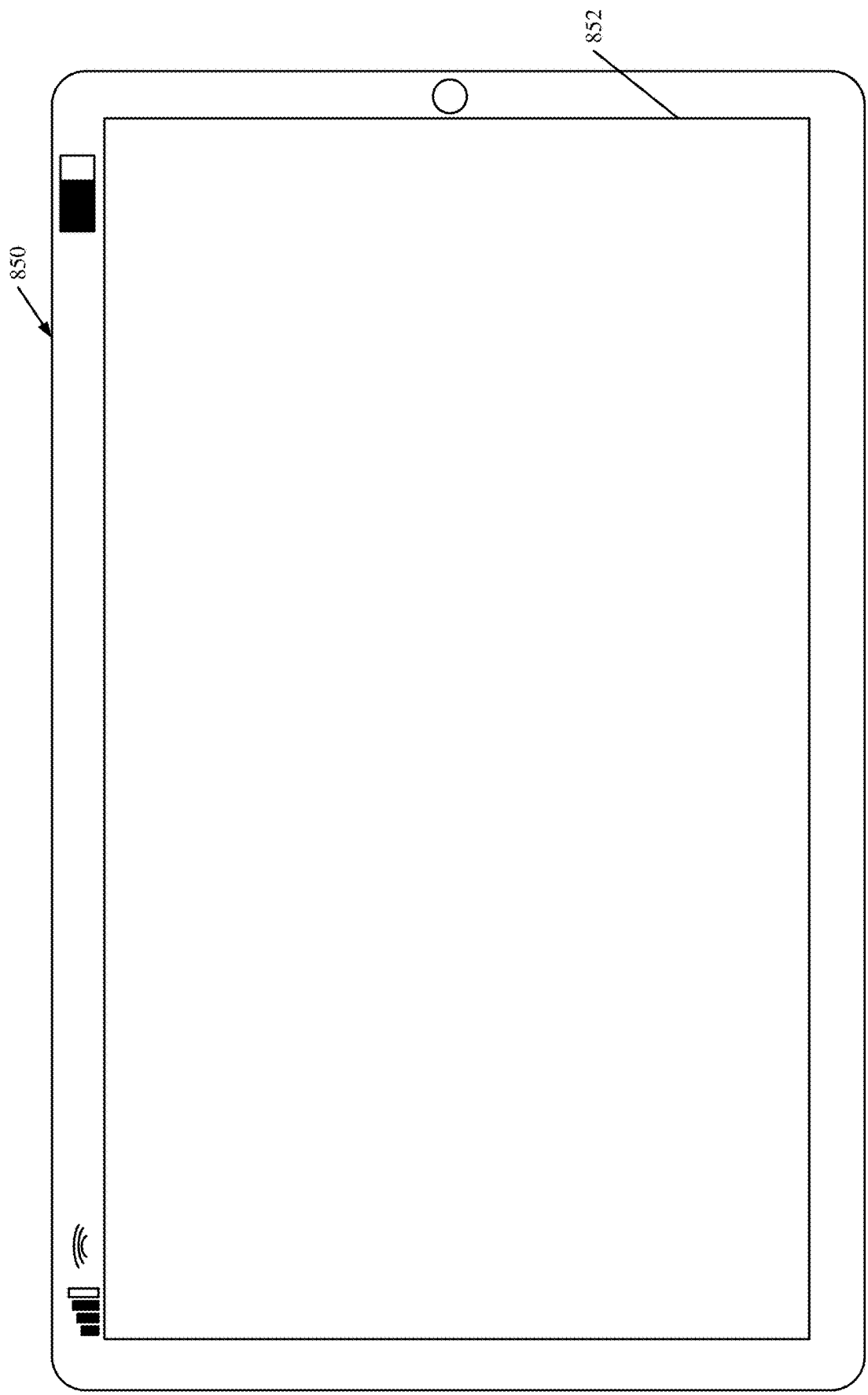
Figure 16:
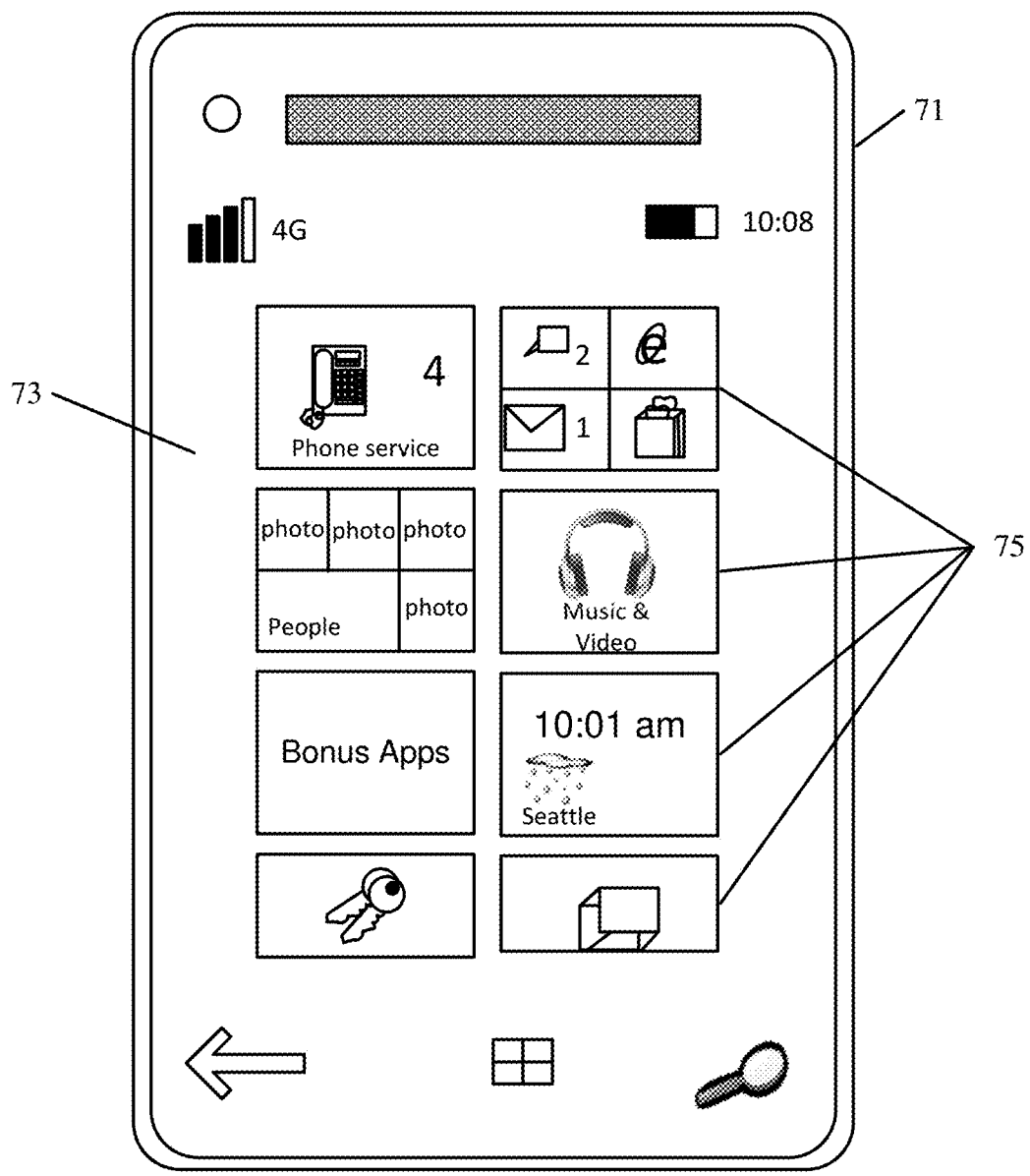

FIG. 14 is a simplified block diagram of one illustrative example of a handheld or mobile computing device that can be used as a user's or client's hand held device 16, in which the present system (or parts of it) can be deployed. For instance, a mobile device can be deployed in the operator compartment of machine 102 and/or 104 for use in generating, processing, or displaying the overspray data and position data. FIGS. 15-16 are examples of handheld or mobile devices.

FIG. 14 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 15 shows one example in which device 16 is a tablet computer 850. In FIG. 15, computer 850 is shown with user interface display screen 852. Screen 852 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 16 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 17:
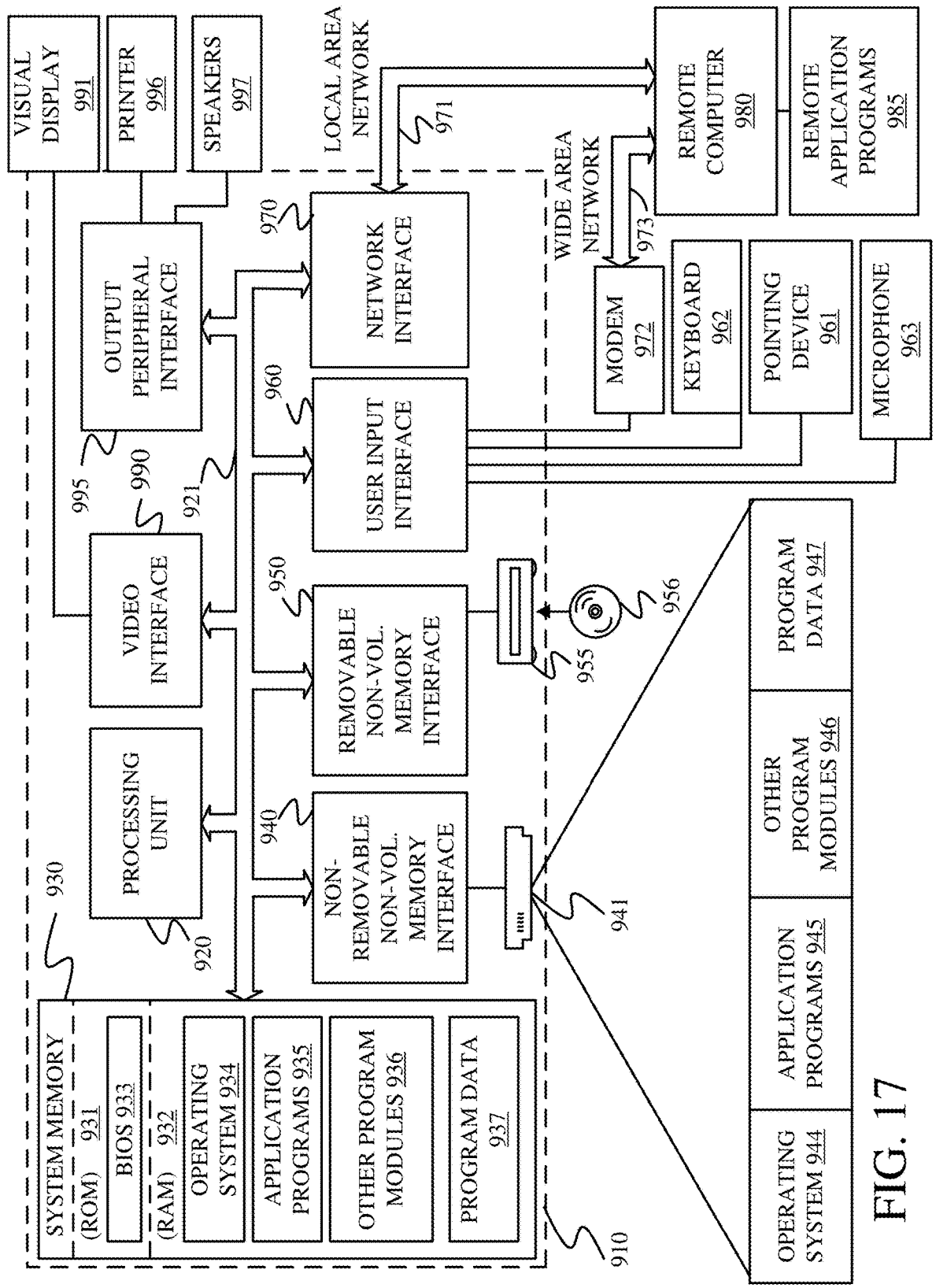
FIG. 17 is a block diagram showing one example of a computing environment that can be used in the architectures and systems shown in the previous FIGS.

FIG. 17 is one example of a computing environment in which elements of previous FIGS., or parts of them, (for example) can be deployed. With reference to FIG. 17, an example system for implementing some embodiments includes a general-purpose computing device in the form of a computer 910 programmed to operate as discussed above. Components of computer 910 may include, but are not limited to, a processing unit 920 (which can comprise processors or servers from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to previous FIGS. can be deployed in corresponding portions of FIG. 17.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 17 illustrates operating system 934, application programs 935, other program modules 936, and program data 937.

The computer 910 may also include other removable/non-removable volatile/nonvolatile computer storage media. By way of example only, FIG. 17 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 17, provide storage of computer readable instructions, data structures, program modules and other data for the computer 910. In FIG. 17, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a controller area network—CAN, a local area network—LAN, or wide area network WAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 17 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Example 1 is a computer-implemented method of controlling a mobile agricultural machine, the method comprising:
  receiving field map data representing a first agricultural operation performed on a field;
  receiving a location sensor signal indicative of a sensed geographic location of the mobile agricultural machine on the field, the mobile agricultural machine having a plurality of sections that are independently controllable to perform a second agricultural operation on the field that is different than the first agricultural operation; and
  generating a control signal to control the plurality of sections based on the field map data and the location sensor signal.

Example 2 is the computer-implemented method of any or all previous examples, wherein the field data comprises a field pass map that represents an input application of a first agricultural machine to the field during the first agricultural operation.

Example 3 is the computer-implemented method of any or all previous examples, wherein the first and second agricultural operations are performed during a same crop growing season.

Example 4 is the computer-implemented method of any or all previous examples, wherein each of the first and second agricultural operations comprises one of:
  a field preparation application;
  a planting application;
  an agricultural product application; or
  a harvesting application.

Example 5 is the computer-implemented method of any or all previous examples, wherein the mobile agricultural machine comprises an agricultural product application machine configured to apply an agricultural product to the field.

Example 6 is the computer-implemented method of any or all previous examples, wherein the mobile agricultural machine comprises a spraying machine, and each section comprises a set of spray nozzles configured to spray the agricultural product.

Example 7 is the computer-implemented method of any or all previous examples, wherein the first agricultural operation comprises a planting operation performed by a planting machine.

Example 8 is the computer-implemented method of any or all previous examples, wherein the mobile agricultural machine comprises an agricultural harvesting machine.

Example 9 is the computer-implemented method of any or all previous examples, and further comprising:
  defining a buffer area; and
  controlling the plurality of sections based on the defined buffer area.

Example 10 is the computer-implemented method of any or all previous examples, and further comprising
  generating a user interface having a buffer zone user input mechanism; and
  defining the buffer zone based on user actuation of the buffer zone user input mechanism.

Example 11 is the computer-implemented method of any or all previous examples, and further comprising:
  generating a field metric based on the field data and performance of the second agricultural operation.

Example 12 is the computer-implemented method of any or all previous examples, wherein the field metric represents one or more of:
  a total area of the field;
  an estimate amount of remaining crop to be processed for the second agricultural operation;
  an estimate amount of remaining field area for the second agricultural operation; or
  an estimate amount of remaining time for the second agricultural operation.

Example 13 is a mobile agricultural machine comprising
  a field operation subsystem comprising a plurality of sections that are independently controllable to perform a given agricultural operation on a field; and
  a control system configured to:
    receive field data representing a prior agricultural operation performed on the field that is different than the given agricultural operation; and
    receive a location sensor signal indicative of a sensed geographic location of the mobile agricultural machine on the field; and generate a control signal to control the plurality of sections based on the field data and the location sensor signal.

Example 14 is the mobile agricultural machine of any or all previous examples, wherein the field data comprises a field pass map that represents an input application of a first agricultural machine to the field during the first agricultural operation.

Example 15 is the mobile agricultural machine of any or all previous examples, wherein the first and second agricultural operations are performed during a same crop growing season.

Example 16 is the mobile agricultural machine of any or all previous examples, wherein each of the first and second agricultural operations comprises one of:
  a field preparation application;
  a planting application; or
  an agricultural product application; or
  a harvesting application.

Example 17 is the mobile agricultural machine of any or all previous examples, wherein the control system is configured to:
  define a buffer area; and
  control the plurality of sections based on the defined buffer area.

Example 18 is the mobile agricultural machine of any or all previous examples, wherein the control system is configured to:
  generate a field metric based on the field data and performance of the second agricultural operation.

Example 19 is a control system for a mobile agricultural machine, the control system comprising
  field data receiving logic configured to receive field data representing a first agricultural operation performed on a field;
  sensor logic configured to receive a location sensor signal indicative of a sensed geographic location of the mobile agricultural machine on the field, the mobile agricultural machine having a plurality of sections that are independently controllable to perform a second agricultural operation on the field that is different than the first agricultural operation; and
  control logic configured to generate a control signal to control the plurality of sections based on the field data and the location sensor signal.

Example 20 is the control system of any or all previous examples, wherein
  the field data comprises a field pass map that represents an input application of a first agricultural machine to the field during the first agricultural operation, and
  the first and second agricultural operations are performed during a same growing season and each comprise one of:
    a field preparation application;
    a planting application;
    an agricultural product application; or
    a harvesting application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of controlling an agricultural spraying machine, the method comprising:
  receiving a prior field map representing locations of a prior agricultural operation performed on a field by an agricultural machine prior to a current spraying operation, on the field, of the agricultural spraying machine separate from the agricultural machine;
  receiving a location sensor signal indicative of a sensed geographic location of the agricultural spraying machine on the field, the agricultural spraying machine having a plurality of sections that are independently controllable relative to one another, each section of the plurality of sections comprising one or more spray nozzles configured to spray an agricultural product on the field;
  based on the location sensor signal, determining a first relative location of a first section, of the plurality of sections of the agricultural spraying machine, to the locations represented in the prior field map;
  based on the location sensor signal, determining a second relative location of a second section, of the plurality of sections of the agricultural spraying machine, to the locations represented in the prior field map;
  generating a first control signal to control the one or more nozzles of the first section of the agricultural spraying machine based on the first relative location; and
  generating a second control signal to control the one or more nozzles of the second section of the agricultural spraying machine based on the second relative location, wherein the first section of the agricultural spraying machine is controlled differently than the second section of the agricultural spraying machine.

2. The computer-implemented method of claim 1, wherein the prior field map comprises a field pass map that represents an input application of the prior agricultural machine to the field during the prior agricultural operation.

3. The computer-implemented method of claim 2, wherein the prior agricultural operation and the current spraying operation are performed during a same crop growing season.

4. The computer-implemented method of claim 1, wherein the prior agricultural operation comprises a field preparation application.

5. The computer-implemented method of claim 4, wherein the agricultural machine comprises a tiller.

6. The computer-implemented method of claim 1, wherein the agricultural machine comprises a planting machine and the prior agricultural operation comprises a planting operation performed by the planting machine that planted seeds in the locations.

7. The computer-implemented method of claim 6, wherein the planting machine comprises one of a planter, an air seeder, or a grain drill.

8. The computer-implemented method of, claim 1, wherein the agricultural machine comprises an agricultural harvesting machine and the prior agricultural operation comprises a harvesting operation performed by the agricultural harvesting machine.

9. The computer-implemented method of claim 1, and further comprising:
  defining a buffer area; and
  controlling the first section based on the defined buffer area.

10. The computer-implemented method of claim 9, and further comprising
  generating a user interface having a buffer zone user input mechanism; and
  defining the buffer zone based on user actuation of the buffer zone user input mechanism.

11. The computer-implemented method of claim 1, and further comprising:
generating a field metric based on the prior field map and performance of the current spraying operation.

12. The computer-implemented method of claim 11, wherein the field metric represents one or more of:
an estimate amount of remaining crop to be sprayed during the current spraying operation;
an estimate amount of remaining field area for the current spraying operation; or
an estimate amount of remaining time for the current spraying operation.

13. A mobile agricultural spraying machine comprising:
a field operation subsystem comprising a plurality of sections that are independently controllable, each section of the plurality of sections comprising a set of spray nozzles configured to spray an agricultural product; and
a control system configured to:
receive a prior field planting map representing a planting, locations by a prior agricultural planting operation performed on the field h an agricultural planting machine that traversed the field separate from the mobile agricultural spraying machine;
receive a location sensor signal indicative of a sensed geographic location of the mobile agricultural spraying machine on the field
based on the location sensor signal, determine a first relative location of a first section, of the plurality of sections, to the planting locations represented in the prior field planting map;
based on the location sensor signal, determine a second relative location of a second section, of the plurality of sections, to the planting locations represented in the prior field planting map;
generate a first control signal to control the first section based on the first relative location; and
generate a second control signal to control the second section based on the second relative location.

14. The mobile agricultural machine of claim 13, wherein the prior agricultural operation and the given agricultural operation are performed during a same crop growing season.

15. The mobile agricultural machine of claim 13, wherein the control system is configured to:
define a buffer area; and
control the plurality of sections based on the defined buffer area.

16. The mobile agricultural machine of claim 13, wherein the control system is configured to:
generate a field metric based on the prior field map and performance of the given agricultural operation.

17. An agricultural machine control system comprising:
field data receiving logic configured to receive prior field data representing locations of a first agricultural operation performed on a field by a first agricultural machine prior to operation, on the field, of a second agricultural machine separate from the first agricultural machine;
sensor logic configured to receive a location sensor signal indicative of a sensed geographic location of the second agricultural machine on the field, the second agricultural machine having a plurality of sections that are independently controllable to perform a second agricultural operation on the field that is different than the first agricultural operation, each section of the plurality of sections comprising one c more, spray nozzles configured to spray an agricultural product; and
control logic configured to:
determine a relative location of each given section, of the plurality of sections, relative to the locations represented by the prior field data and generate a control signal to the control the given section based on the relative location, wherein a first section of the plurality of sections of the second agricultural machine is controlled differently than a second section of the plurality of sections of the second agricultural machine.

18. The control system of claim 17, wherein
the prior field, data comprises a field pass map that represents an input application of the first agricultural machine to the field during the first agricultural operation, and
the first and second agricultural operations are performed during a same growing season and each comprise a different one of:
a field preparation application;
a planting application;
an agricultural product application; or
a harvesting application.

19. The computer-implemented method of claim 1, wherein
the first control signal activates the one or more nozzles in the first section to spray the agricultural product, and
the second control signal deactivates the one or more nozzles in the second section.

20. The mobile agricultural spraying machine of claim 13, wherein
the first control signal activates the one or more a first set of nozzles in the first section to spray the agricultural product, and
the second control signal deactivates a second set of nozzles in the second section.

* * * * *